US008970088B2

(12) United States Patent
Kimura et al.

(10) Patent No.: US 8,970,088 B2
(45) Date of Patent: Mar. 3, 2015

(54) THERMIONIC CONVERTER

(75) Inventors: Yuji Kimura, Nagoya (JP); Susumu Sobue, Obu (JP); Mitsuhiro Kataoka, Kasugai (JP); Eiichi Okuno, Mizuho (JP); Shoichi Kawai, Kuwana (JP)

(73) Assignee: Denso Corporation, Kariya (JP)

( * ) Notice: Subject to any disclaimer, the term of this patent is extended or adjusted under 35 U.S.C. 154(b) by 574 days.

(21) Appl. No.: 12/964,145

(22) Filed: Dec. 9, 2010

(65) Prior Publication Data

US 2011/0139205 A1 Jun. 16, 2011

(30) Foreign Application Priority Data

Dec. 11, 2009 (JP) ................................ 2009-281369

(51) Int. Cl.
*H02N 10/00* (2006.01)
*H01J 45/00* (2006.01)

(52) U.S. Cl.
CPC .................................... *H01J 45/00* (2013.01)
USPC ........................................................ 310/306

(58) Field of Classification Search
USPC ........................................ 310/306; 313/491
See application file for complete search history.

(56) References Cited

U.S. PATENT DOCUMENTS 5,619,092 A * 4/1997 Jaskie .......................... 313/309
5,675,972 A * 10/1997 Edelson .......................... 62/3.1
5,722,242 A * 3/1998 Edelson .......................... 62/3.1
6,396,191 B1 5/2002 Hagelstein et al.
6,489,704 B1 12/2002 Kucherov et al.
8,159,108 B2 * 4/2012 Rasor et al. .................. 310/306
8,188,456 B2 * 5/2012 Nemanich et al. .............. 257/10
2003/0184188 A1 10/2003 Kucherov et al.
2004/0207037 A1 10/2004 Kucherov et al.
2005/0127814 A1 6/2005 Deguchi et al.
2005/0155642 A1 * 7/2005 Chen ............................ 136/252
2007/0024154 A1 2/2007 Kucherov et al.
2007/0057277 A1 * 3/2007 Martsinovsky et al. ...... 257/104
2007/0108887 A1 5/2007 Deguchi et al.
2009/0167139 A1 7/2009 Yamada et al.
2010/0084634 A1 * 4/2010 Gamo et al. .................... 257/40

FOREIGN PATENT DOCUMENTS

JP A-2004-349398 12/2004
JP A-2005-067915 3/2005
JP A-2006-073899 3/2006

(Continued)

OTHER PUBLICATIONS

Makino, JP 2008-294129, Dec. 2008, Machine Translation.*

(Continued)

*Primary Examiner* — Burton Mullins
(74) *Attorney, Agent, or Firm* — Posz Law Group, PLC

(57) ABSTRACT

A thermionic converter for converting thermal energy to electrical energy includes an emitter and a collector. The emitter emits thermionic electrons upon receipt of heat from a heat source. The emitter is made of a first semiconductor material to which a first semiconductor impurity is doped with a first concentration. The collector is spaced and opposite to the emitter to receive the thermionic electrons emitted from the emitter so that the thermal energy is converted to electrical energy. The collector is made of a second semiconductor material to which a second semiconductor impurity is doped with a second concentration less than the first concentration.

16 Claims, 15 Drawing Sheets

(56) References Cited

FOREIGN PATENT DOCUMENTS

| | | |
|---|---|---|
| JP | A-2007-005589 | 1/2007 |
| JP | A-2007-258342 | 10/2007 |
| JP | A-2008-228478 | 9/2008 |
| JP | A-2008-294129 | 12/2008 |

OTHER PUBLICATIONS

F.A.M. Koeck, Y.j. Tang, R.J. Nemanich, Organizing Committee NDNC2007, NDNC 2007 New Diamond and Nano Carbons 2007, May 28, 2007, p. 97 "Direct thermionic energy conversion from nitrogen doped diamond films", North Carolina State University, Raleigh, NC, USA, Arizona State University, Tempe, AZ, USA. (Discussed on p. 2 of the Specification).

Mariko Suzuki, Tomio Ono, Naoshi Sakuma, Tdashi Sakai, Diamond & Related Materials 18 (2009) 1274-1277. (Discussed on p. 11 of the Specification).

F.A.M. Koeck et al., "On the thermionic emission from nitrogen-doped diamond films with respect to energy conversion," Diamond & Related Materials, Aug. 14, 2004, vol. 13, pp. 2052-2055.

Mariko Suzuki et al., "Low-temperature thermionic emission from nitrogen-doped nanocrystalline diamond films on n-type Si grown by MPCVD," Diamond & Related Materials, May 9, 2009, vol. 18, pp. 1274-1277.

Hui Tong Chua et al., "Thermionic and tunneling cooling thermodynamics," Applied Physics Letters, May 2004, vol. 84, No. 20, pp. 3999-4001.

Man-Seob Choi et al., "Field-emission characteristics of nitrogen-doped diamond-like carbon film deposited by filtered cathodic vacuum arc technique," Journal of Non-crystalline Solids, 2003, vol. 324, pp. 187-191.

Ian J. M. Booth, "Anomalous surface effects in vacuum tubes," Speculations in Science and Technology, 1985, vol. 8, No. 4, pp. 219-223.

Office Action mailed on Jul. 31, 2012 issued in corresponding JP Application No. 2009-281369 (and English translation).

Office Action mailed Nov. 8, 2011 in corresponding JP Application No. 2009-281369 (and English translation).

Koeck et al. "Thermionic electron emission from low work-function phosphorus doped diamond films." *Diamond & Related Materials* 18 (2009) p. 789-791.

Office Action mailed Mar. 26, 2013 in corresponding JP Application No. 2009-281369 (and English translation).

Office Action mailed Nov. 5, 2013 in the corresponding JP application No. 2009-281369 (English translation).

* cited by examiner

THERMIONIC CONVERTER

CROSS REFERENCE TO RELATED APPLICATION

This application is based on and incorporates herein by reference Japanese Patent Application No. 2009-281369 filed on Dec. 11, 2009.

FIELD OF THE INVENTION

The present invention relates to a thermionic converter for converting thermal energy into electrical energy.

BACKGROUND OF THE INVENTION

A thermionic converter has been disclosed in, for example, JP 2004-349398 A. The thermionic converter converts thermal energy into electrical energy by using a phenomenon in which thermionic electrons are emitted from a surface of an electrode at high temperature. In JP 2004-349398 A, it is discussed that a distance between electrodes is reduced to the order of nanometers to improve thermionic electron emission efficiency by using the tunneling phenomenon in order to achieve high efficient conversion. Further, it is discussed that multiple thermionic converters are connected in series to obtain high electromotive force.

Regarding the first discussion, it is difficult to maintain such a small distance between the electrodes. Regarding the second discussion, the conversion efficiency may be reduced due to heat transmission from an emitter to a collector through a wire for connecting the thermionic converters together.

Further, when a temperature of the collector rises, back emission may occur. The back emission is a phenomenon in which thermionic electrons are emitted from the collector. Since the thermionic electrons emitted from the collector cancel the thermionic electrons emitted from the emitter, the conversion efficiency is reduced. It is necessary that a temperature of the emitter is higher than the temperature of the collector. In other words, a higher-temperature electrode acts as an emitter, and a lower-temperature electrode acts as a collector. Generally, the collector is cooled by a cooling device so that the temperature of the collector can remain lower than the temperature of the emitter.

The reference below has reported that when diamond semiconductor is used in an emitter and a collector of a thermionic converter, thermionic electrons are emitted from each electrode surface with very high efficiency because of the negative electron affinity (NEA) effect so that high efficiency conversion can be achieved at low temperature compared to metal.

REFERENCE

F. A. M. Koeck, Y. j. Tang, R, j. Nemanich, Organizing Committee NDNC2007, NDNC 2007 New Diamond and Nano Carbons 2007, May 28, 2007, p 97, "Direct thermionic energy conversion from nitrogen doped diamond films", North Carolina State University, Raleigh, N.C., USA, Arizona State University, Tempe, Ariz., USA.

However, even if diamond semiconductor is used for an emitter and a collector of a thermionic converter, thermionic electrons are emitted from the collector when a temperature of the collector rises. That is, since the back emission of thermionic electrons from the collector occurs, the conversion efficiency of the thermionic converter may be reduced.

SUMMARY OF THE INVENTION

In view of the above, it is an object of the present invention to provide a thermionic converter for improving conversion efficiency by controlling back emission of thermionic electrons from a collector without reducing a temperature of the collector.

According to an aspect of the present invention, a thermionic converter for converting thermal energy into electrical energy includes an emitter and a collector. The emitter emits thermionic electrons upon receipt of heat from a heat source. The emitter is made of a first semiconductor material to which a first semiconductor impurity is doped with a first concentration. The collector is spaced and opposite to the emitter to receive the emitted thermionic electrons so that the thermal energy is converted into electrical energy. The collector is made of a second semiconductor material to which a second semiconductor impurity is doped with a second concentration less than the first concentration. Each of the first semiconductor material and the second semiconductor material preferably can be diamond, boron nitride, or a carbon film with an amorphous structure mainly having carbon atoms. The emitter preferably can have a first hydrogen-terminated surface, and the collector preferably can have a second hydrogen-terminated surface spaced and opposite to the first hydrogen-terminated surface of the emitter. Multiple thermionic converters, each of which has the emitter and the collector, preferably can be connected in series to from a thermionic converter.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS

Figure 1:
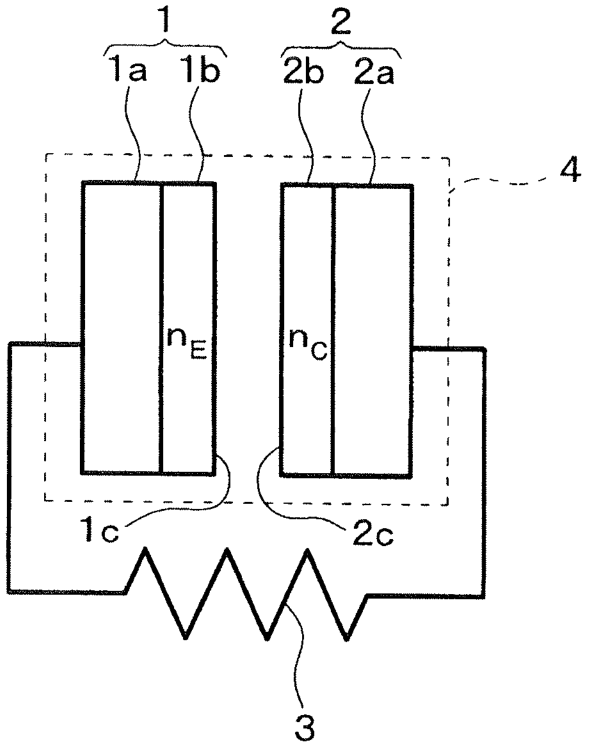
FIG. 1 is a diagram illustrating a thermionic converter according to a first embodiment of the present invention.

Embodiments of the present invention are described below with reference to the drawings. Throughout the embodiments, the same symbols are given to the same or corresponding parts in the drawings.

First Embodiment

A thermionic converter according to a first embodiment of the present invention is described below with reference to FIG. 1. The thermionic converter is configured to convert thermal energy into electrical energy by using thermionic electrons moving between a pair of opposing electrodes.

Specifically, as shown in FIG. 1, the thermionic converter includes a pair of electrodes having an emitter 1 and a collector 2. The thermionic converter supplies power to a load 3 that is connected between the emitter 1 and the collector 2 by using thermionic electrons that move between the emitter 1 and the collector 2. In FIG. 1, the emitter 1 and the collector 2 are illustrated as a cross-section.

The emitter 1 includes a substrate 1*a* and a diamond semiconductor thin film 1*b* on the substrate 1*a*. The collector 2 includes a substrate 2*a* and a diamond semiconductor thin film 2*b* on the substrate 2*a*. The substrates 1*a*, 2*a* have electrical conductivity and heat resistance. For example, the substrates 1*a*, 2*a* can be a diamond substrate, a silicon (Si) substrate, a molybdenum (Mo), or the like. In the case of a diamond substrate, the substrate substrates 1*a*, 2*a* can have three square millimeters ($mm^2$). In the case of a molybdenum substrate, the substrate substrates 1*a*, 2*a* can have one square inch ($in^2$).

The diamond semiconductor thin films 1*b*, 2*b* can be formed on the substrates 1*a*, 2*a*, respectively, for example, by a chemical vapor deposition (CVD) method, a sputtering method, or the like. Specifically, the diamond semiconductor thin films 1*b*, 2*b* can be formed on the substrates 1*a*, 2*a*, respectively, by a microwave plasma CVD, a radio-frequency (RF) Plasma CVD method, a DC plasma CVD, a RF plasma sputtering method, a DC plasma sputtering method, or the like. There is no matter whether diamond of the diamond semiconductor thin films 1*b*, 2*b* has a monocrystalline structure or a polycrystalline structure. For example, when a high-pressure-synthesized diamond substrate is used as the substrates 1*a*, 2*a*, diamonds of the diamond semiconductor thin films 1*b*, 2*b* formed on the diamond semiconductor thin films 1*b*, 2*b*, for example, by a CVD method have a monocrystalline structure. The present inventors have confirmed that there is no dependency of conversion efficiency of the thermionic converter on the thicknesses of the diamond semiconductor thin films 1*b*, 2*b*. Therefore, the thicknesses of the diamond semiconductor thin films 1*b*, 2*b* are not limited to specific values. It is preferable that the diamond semiconductor thin films 1*b*, 2*b* be uniformly formed over the respective substrates 1*a*, 2*a*. It is preferable that the diamond semiconductor thin films 1*b*, 2*b* have the same thickness.

According to the first embodiment, opposing surfaces 1*c*, 2*c* of the diamond semiconductor thin films 1*b*, 2*b* are hydrogen-terminated. Advantages of the hydrogen-terminated surfaces 1*c*, 2*c* compared to oxygen-terminated surfaces are discussed below.

Figure 2A:
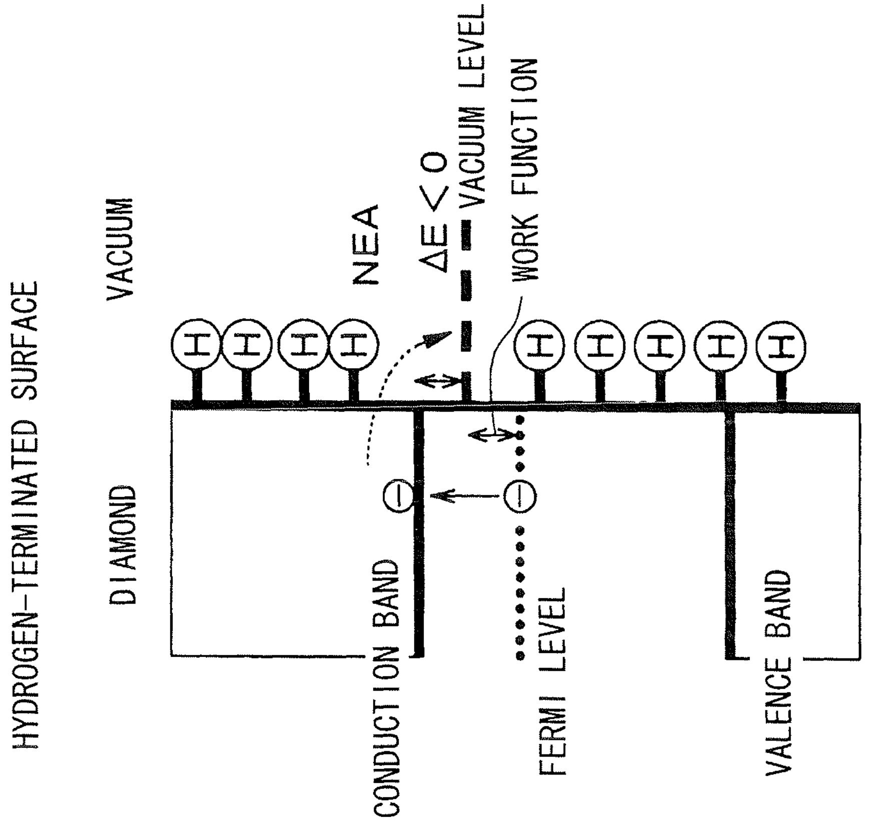
FIG. 2A is an energy band diagram in the case of a hydrogen-terminated surface.
Figure 2B:
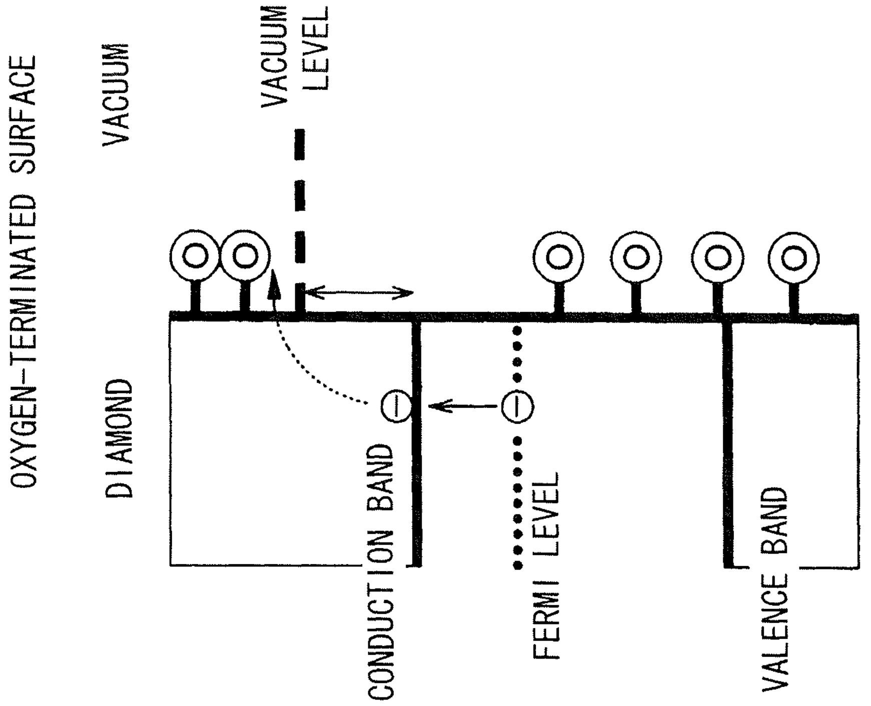
FIG. 2B is an energy band diagram in the case of an oxygen-terminated surface.

FIG. 2A is an energy band diagram when the surface is of the diamond semiconductor thin film 1*b* is hydrogen-terminated. FIG. 2B is an energy band diagram when the surface is of the diamond semiconductor thin film 1*b* is oxygen-terminated.

As shown in FIG. 2A, in the case of the hydrogen-terminated surface 1*c*, the vacuum level is below the conduction band (i.e., $\Delta E<0$) because of a negative electron affinitiy (NEA). Therefore, electrons in the conduction band are emitted into vacuum with no energy (i.e., energy=0). Accordingly, the work function, which is the energy difference between the Fermi energy and the vacuum level, is small. In contrast, as shown in FIG. 2B, in the case of the oxygen-terminated surface 1*c*, the vacuum level is above the conduction band (i.e., $\Delta E>0$) because of a positive electron affinitiy (PEA). Therefore, energy is required to emit electrons in the conduction band into vacuum. Accordingly, the work function is large.

As discussed above, an electron affinitiy polarity can depend on the termination structure of the surface 1*c* of the diamond semiconductor thin film 1*b*. When the surface is of the diamond semiconductor thin film 1*b* is hydrogen-terminated, a very stable negative electron affinitiy is obtained so that high efficiency emission of thermionic electrons can be continued over a long period of time. The same holds true for the case of the hydrogen-terminated surface 2*c* of the diamond semiconductor thin film 2*b*.

The emitter 1 and the collector 2 are spaced and opposite to each other in such a manner that the diamond semiconductor thin films 1*b*, 2*b* (i.e., the surfaces 1*c*, 2*c*) face each other with a predetermined separation distance suitable for the conversion from thermal energy to electrical energy. According to the first embodiment, space is defined between the diamond semiconductor thin films 1*b*, 2*b* so that the separation distance between the diamond semiconductor thin films 1*b*, 2*b* can be maintained. Alternatively, a spacer (not shown) can be placed between the diamond semiconductor thin films 1*b*, 2*b* so that the separation distance between the diamond semiconductor thin films 1*b*, 2*b* can be maintained. For example, an insulation film having a thickness corresponding to the separation distance between the diamond semiconductor thin films 1*b*, 2*b* can be placed between the diamond semiconductor thin films 1*b*, 2*b* in such a manner that the diamond semiconductor thin films 1*b*, 2*b* are in contact with the insulation film. In such an approach, the separation distance between the diamond semiconductor thin films 1*b*, 2*b* can be surely maintained. For example, the insulation layer as a spacer can be made of mica.

As shown in FIG. 1, the emitter 1 and the collector 2 that are spaced and opposite to each other are placed in a vacuum chamber 4 maintained under vacuum. Thus, the space between the diamond semiconductor thin film 1*b* of the emitter 1 and the diamond semiconductor thin film 2*b* of the collector 2 is maintained under vacuum.

Further, according to the first embodiment, semiconductor impurities as dopants are added to the diamond semiconductor thin films 1*b*, 2*b*. Depending on the dopants added to the diamond semiconductor thin films 1*b*, 2*b*, the diamond semiconductor thin films 1*b*, 2*b* can have the following three combinations of conductivity types. In a first combination, each of the diamond semiconductor thin films 1*b*, 2*b* is of N-type. In a second combination, one of the diamond semiconductor thin films 1*b*, 2*b* is of N-type, and the other of the diamond semiconductor thin films 1*b*, 2*b* is of P-type. In a third combination, each of the diamond semiconductor thin films 1*b*, 2*b* is of P-type. In the case of the first combination and the second combination, the emitter 1 and the collector 2 need to be heated to high temperatures. Therefore, the third combination is preferred.

It is noted that a dopant concentration of the diamond semiconductor thin film 1*b* of the emitter 1 is greater than a dopant concentration of the diamond semiconductor thin film 2*b* of the collector 2.

For example, the emitter 1 can have the dopant concentration of $1\times10^{2o}$ (atoms/cm$^3$), and the collector 2 can have the dopant concentration of $1\times10^{19}$ (atoms/cm$^3$). That is, the dopant concentration of the emitter 1 can be ten times greater than the dopant concentration of the collector 2.

It is preferable that the emitter 1 have the dopant concentration of $1\times10^{19}$ (atoms/cm$^3$) or more. When the dopant concentration of the emitter 1 is less than $1\times10^{19}$ (atoms/cm$^3$), the conversion efficiency may be low due to the small number of excited thermionic electrons.

Further, it is preferable that the dopant concentration of the collector 2 be equal to or less than one-tenth of the dopant concentration of the emitter 1. When the dopant concentration of the collector 2 is less than the dopant concentration of the emitter 1, the number of thermionic electrons excited in the collector 2 can become less than the number of thermionic electrons excited in the emitter 1.

Examples of the dopants added to the diamond semiconductor thin films 1*b*, 2*b* can include nitrogen (N), phosphorus (P), arsenic (As), antimony (Sb), and sulfur (S). Nitrogen (N) has a donor level of 1.7 eV, phosphorus (P) has a donor level of 0.57 eV, arsenic (As) has a donor level of 0.4 eV, antimony (Sb) has a donor level of 0.2 eV, and sulfur (S) has a donor level of 0.4 eV.

The thermionic converter according to the first embodiment operates as follows. As mentioned previously, the thermionic converter converts thermal energy to electrical energy by using a phenomenon in which thermionic electrons are emitted from an electrode surface. Specifically, when heat is applied to the emitter 1 from an external heat source, thermionic electrons are excited to the conduction band from the Fermi level of diamond semiconductor in the emitter 1. Since the conduction band of diamond semiconductor is higher than the vacuum level due to a negative electron affinity, there is no barrier so that the thermionic electrons excited to the conduction band can be emitted into vacuum.

The space between the emitter 1 and the collector 2 is maintained under vacuum, and the separation distance between the emitter 1 and the collector 2 is small. Therefore, the thermionic electrons can move from the surface (i.e., the surface is of the diamond semiconductor thin film 1*b*) of the emitter 1 to the surface (the surface 2*c* of the diamond semiconductor thin film 2*b* of the collector 2. The thermionic electrons moved to the collector 2 returns to the emitter 1 by way of the load 3. In this way, the thermionic converter supplies power to the load 3 by using the thermionic electrons moving between the emitter 1 and the collector 2.

The present inventors have confirmed that when the dopant concentration of the collector 2 is less than the dopant concentration of the emitter 1, the number of electrons that are emitted from the collector 2 and reach the emitter 1 is reduced so that the conversion efficiency of the thermionic converter can be improved. The reasons for this are described below with reference to FIGS. 3-13.

The flow of thermionic electrons emitted from the emitter 1, i.e., the maximum emitter current $J_E$ is given by the following equation:

$$J_E = A n_E T^2 \exp(-e\phi_E/kT) \quad (1)$$

The flow of thermionic electrons emitted from the collector 2 acts as the back emission that cancels the flow of thermionic electrons emitted from the emitter 1.

In the above equations (1), (2), "A" is the Richardson's constant, "$n_E$" is the dopant concentration of the emitter 1, "$n_C$" is the dopant concentration of the collector 2, "T" is the temperature of the emitter 1 and the collector 2, "e" is the elementary electric charge, "k" is the Boltzmann's constant, "$\phi_E$" is the work function of a semiconductor material (i.e., diamond semiconductor thin film 1*b*) of the emitter 1, and "$\phi_C$" is the work function of a semiconductor material (i.e., diamond semiconductor thin film 2*b*) of the collector 2.

As can be understood from the equations (1), (2), the maximum emitter current $J_E$ is proportional to the dopant concentration $n_E$ of the emitter 1, and the maximum collector current $J_C$ is proportional to the dopant concentration $n_C$ of the collector 2. Thus, amplitudes of the maximum currents $J_E$, $J_C$ vary in proportion to the dopant concentrations $n_E$, $n_C$, respectively.

For example, the proportional relationship between the maximum currents $J_E$, $J_C$ and the dopant concentrations $n_E$, $n_C$ is described on pages 1274-1277 (in particular, the description regarding FIG. 6) of "Diamond & Related Materials 18", published on 2009 and written by Mariko Suzuki, Tomio Ono, Naoshi Sakuma, and Tadashi Sakai.

In the discussion below, a first case where the emitter 1 and the collector 2 have the same dopant concentration is compared with a second case where the emitter 1 and the collector 2 have different dopant concentrations. In each case, phosphorus (P) is added as a dopant to the diamond semiconductor thin film 1*b* of the emitter 1, and nitrogen (N) is added as a dopant to the diamond semiconductor thin film 2*b* of the collector 2.

Firstly, the first case where the emitter 1 and the collector 2 have the same temperature (i.e., $T_E = T_C$) and have the same dopant concentration (i.e., $n_E = n_C$) is discussed below with reference to FIG. 3 and FIGS. 4A, 4B.

Figure 3:
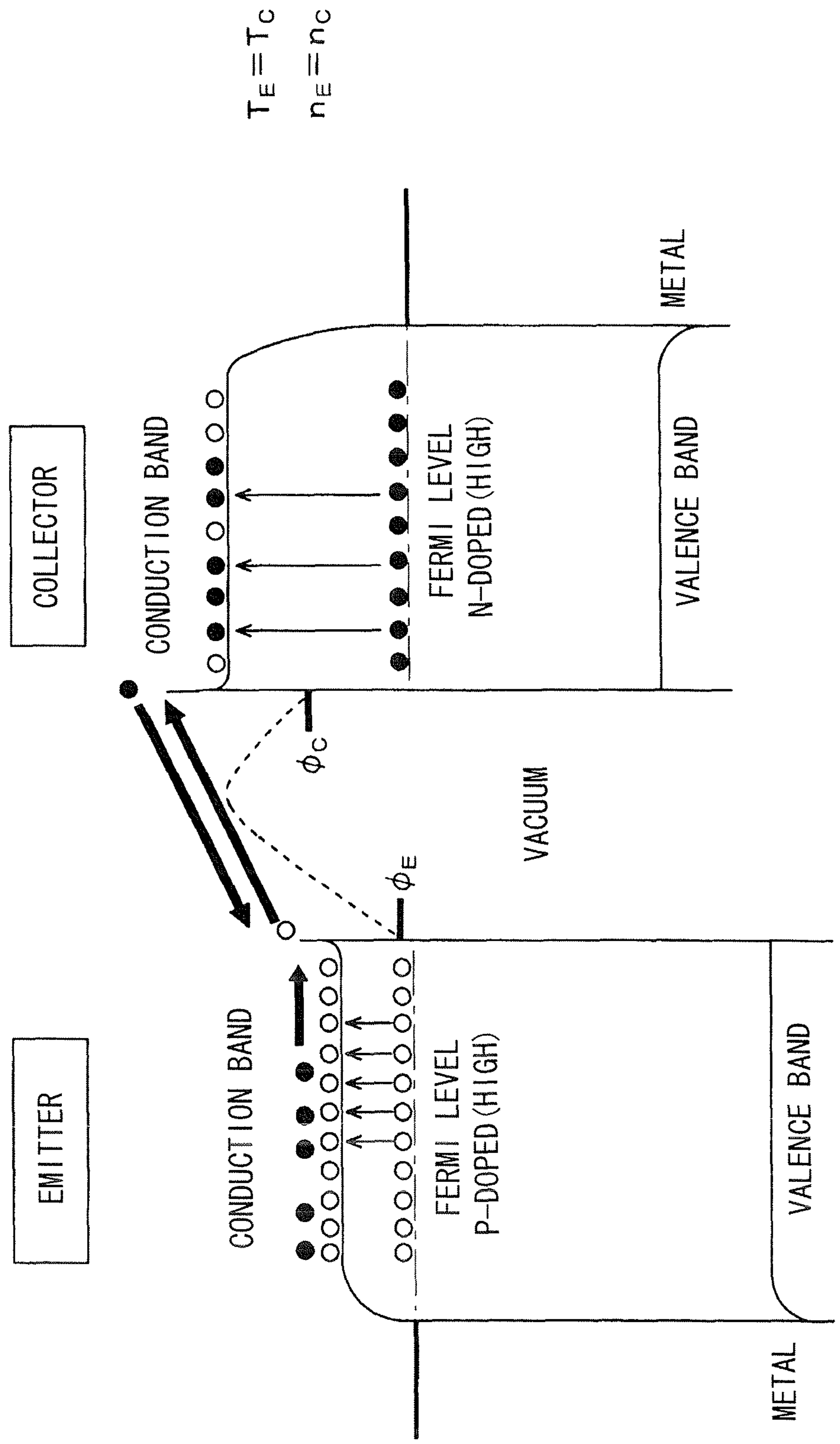
FIG. 3 is an energy band diagram under conditions that an emitter and a collector have the same dopant concentration and that a work function $\phi_E$ of the emitter is less than a work function $\phi_C$ of the collector.

FIG. 3 is an energy band diagram of the first case where the emitter 1 and the collector 2 have the same dopant concentration. FIGS. 4A and 4B are graphs illustrating a relationship between an output voltage Vo and an output current Jo of the thermionic converter in the first case where the emitter 1 and the collector 2 have the same dopant concentration. In the graphs of FIGS. 4*a*, 4B, the horizontal axis represents the output voltage Vo of the thermionic converter, and the vertical axis represents the output current Jo of the thermionic converter.

As shown in FIG. 3, the work functions $\phi_C$, $\phi_E$ of the emitter 1 and the collector 2 having a negative electron affinity (NEA) are smaller than the energy at the bottom of the conduction band due to the effect of the negative electron affinity. In the case of a material having no negative electron affinity, the vacuum level is above the conduction band. The Fermi level of the emitter 1 depends on the dopant added to the emitter 1, and the Fermi level of the collector 2 depends on the dopant added to the collector 2. The difference in Fermi levels between the emitter 1 and the collector 2 is the electromotive force.

The "metal" in FIG. 3 depicts the substrate is of the emitter 1, the substrate 2*a* of the collector 2, a wire, or the like. The broken line in FIG. 3, connecting the work function $\phi_E$ of the emitter 1 to the work function $\phi_C$ of the collector 2, depicts a space-charge barrier. The thermionic electrons emitted into the vacuum move between the emitter 1 and the collector 2 by overcoming at least the space-charge barrier. It is noted that FIGS. 4A and 4B are based on the assumption that the maximum currents $J_E$, $J_C$ are not affected by space charge. The same holds for FIG. 5 and FIGS. 6A and 6B, which will be described later.

Figure 4A:
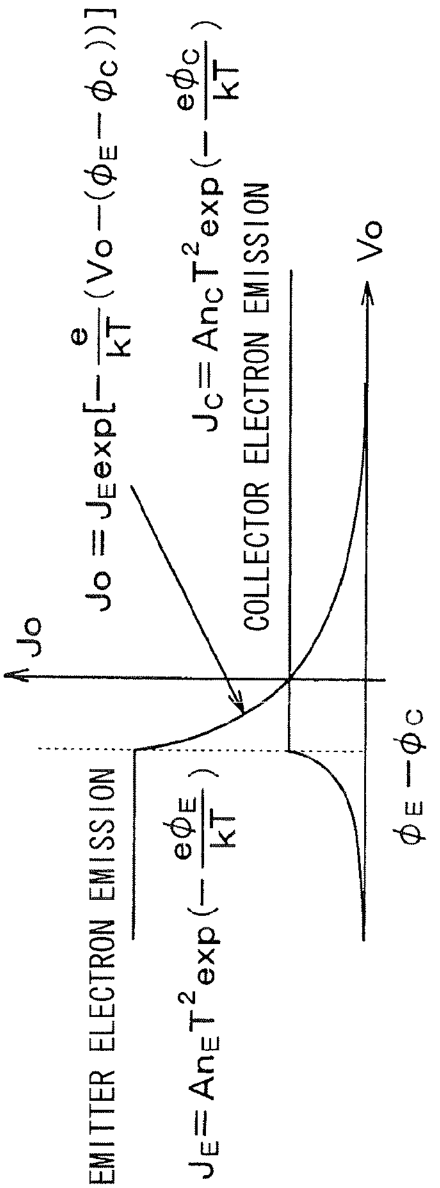
FIGS. 4A and 4B are diagrams illustrating a relationship between an output voltage and an output current of the thermionic converter under conditions that an emitter and a collector have the same dopant concentration and that the work function $\phi_E$ of the emitter is less than the work function $\phi_C$ of the collector.

As shown in FIG. 4A, regarding electron emission from the emitter 1, when the output voltage Vo is less than "$\phi_E-\phi_C$", the maximum emitter current $J_E$ has a constant value. In contrast, when the output voltage Vo is greater than "$\phi_E-\phi_C$", the maximum emitter current $J_E$ expressed as "Jo" decreases in an exponential manner and is given by the following equation:

$$Jo=J_E\exp[-e(Vo-(\phi_E-\phi_C))/kT] \quad (3)$$

On the other hand, regarding electron emission from the collector 2, when the output voltage Vo is greater than "$\phi_E-\phi_C$", the maximum collector current $J_C$ has a constant value. In contrast, when the output voltage Vo is less than "$\phi_E-\phi_C$", the maximum collector current $J_C$ decreases in an exponential manner. This electron emission from the collector 2 is the back emission.

The intercept of the graph of the electron emission Jo from the emitter 1 at the point where Vo=0 is given as follows by substituting Vo=0 into the equation (3):

$$Jo=An_ET^2\exp(-(e\phi_C/kT)) \quad (4)$$

Since the emitter 1 and the collector 2 have the same temperature (i.e., $T_E=T_C$) and the same dopant concentration (i.e., $n_E=n_C$), the intercept of the graph of the electron emission Jo from the emitter 1 is equal to the intercept of the graph of the electron emission $J_C$ from the collector 2 at the point where V=0.

Figure 4B:
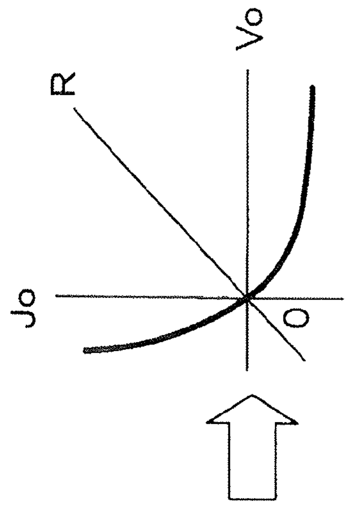

Therefore, when the electron emission from the collector 2 shown in FIG. 4A is cancelled from the electron emission from the emitter 1 shown in FIG. 4A, a graph representing the conversion (i.e., power generation) becomes a curve passing the point where Vo=0, and Jo=0, as shown in FIG. 4B. It is noted that the output voltage Vo greater than zero (i.e., Vo>0) means that the conversion is achieved. Therefore, from FIG. 4B, it can be seen that the conversion is not achieved when the emitter 1 and the collector 2 have the same temperature and the same dopant concentration.

In FIG. 4B, the straight line "R" depicts a resistance of the load 3. In other words, the straight line "R" depicts the relationship between a voltage applied to the load 3 and a current flowing through the load 3. Since the curve representing the conversion passes through the point where Vo=0, and Jo=0, no voltage applied to the load 3, and no current flows through the load 3.

In view of the energy band diagram of FIG. 3, since the number of electrons present in the Fermi level of the emitter 1 is equal to the number of electrons present in the Fermi level of the collector 2, the number of thermionic electrons emitted from the emitter 1 to the collector 2 is equal to the number of thermionic electrons emitted from the collector 2 to the emitter 1. Therefore, although thermionic electrons are emitted from the emitter 1, the thermionic electrons emitted from the emitter 1 is canceled by the back emission of thermionic electrons from the collector 2 so that the output current Jo can be zero in total.

When the emitter 1 and the collector 2 have the same temperature, the number of thermionic electrons excited in the emitter 1 is greater than the number of thermionic electrons excited in the collector 2 due to the fact that the work function $\phi_E$ of the emitter 1 is less than the work function $\phi_C$ of the collector 2. It is noted that when thermionic electrons move from one electrode having a small work function to the other electrode having a large work function, the thermionic electrons need to overcome an energy barrier corresponding to the difference in work functions of the electrodes. Therefore, the number of thermionic electrons that are excited in the emitter 1 and reach the collector 2 becomes equal to the number of thermionic electrons that are excited in the collector 2 and reach the emitter 1. As a result, there is no conversion so that power cannot be generated.

Figure 5:
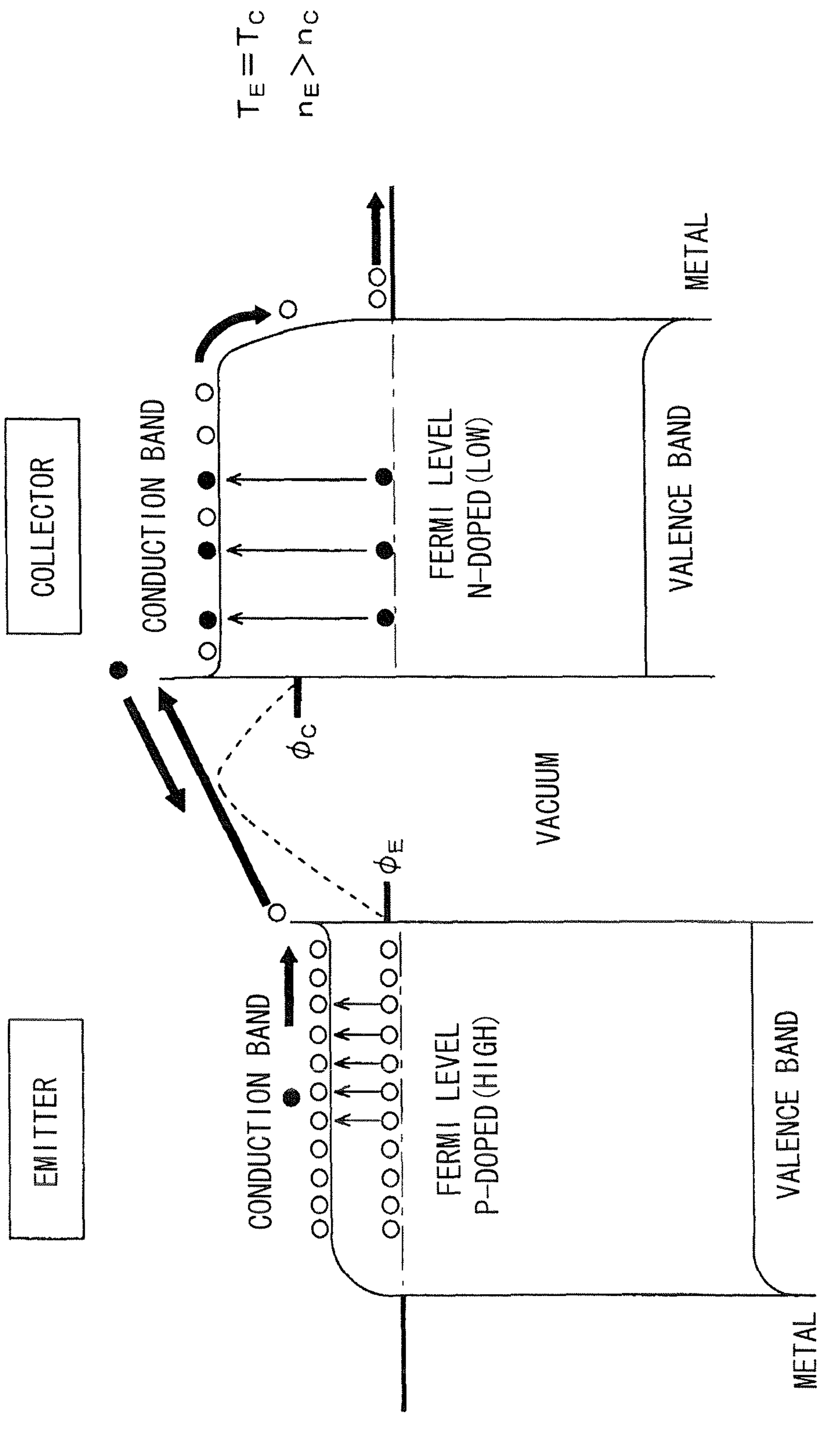
FIG. 5 is an energy band diagram under conditions that the dopant concentration of the emitter is greater than the dopant concentration of the collector and that the work function $\phi_E$ of the emitter is less than the work function $\phi_C$ of the collector.
Figure 6A:
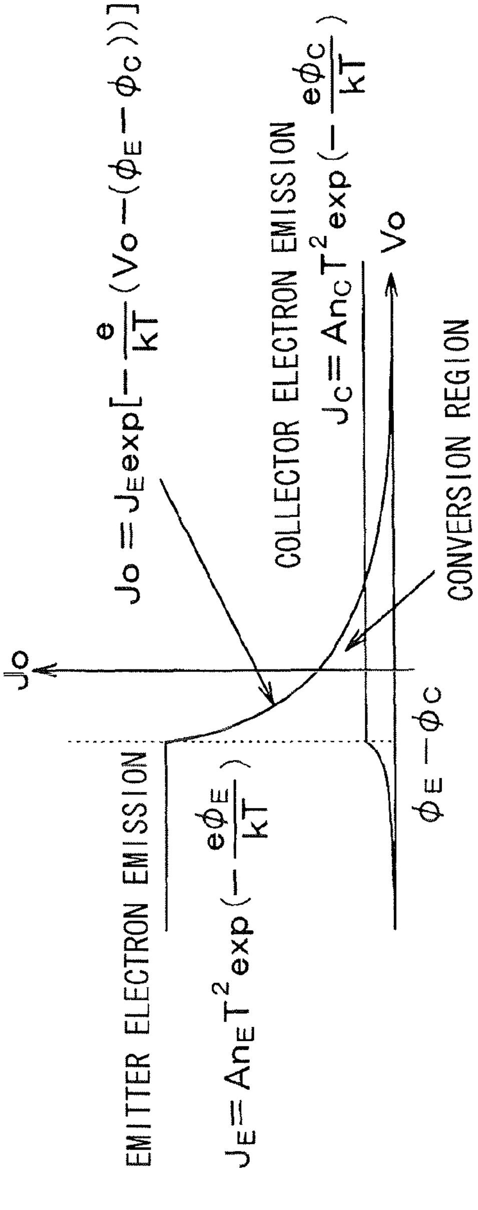
FIGS. 6A and 6B are diagrams illustrating the relationship between the output voltage and the output current of the thermionic converter under conditions that the dopant concentration of the emitter is greater than the dopant concentration of the collector and that the work function $\phi_E$ of the emitter is less than the work function $\phi_C$ of the collector.
Figure 6B:
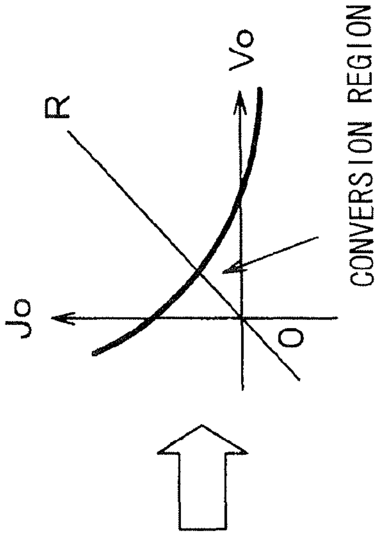

Next, the second case where the emitter 1 and the collector 2 have the same temperature (i.e., $T_E=T_C$) but have different dopant concentrations (i.e., $n_E>n_C$) is discussed below with reference to FIG. 5 and FIGS. 6A, 6B. FIG. 5 is an energy band diagram of the second case where the dopant concentration $n_C$ of the collector 2 is less than the dopant concentration $n_E$ of the emitter 1. FIGS. 6A and 6B are graphs illustrating a relationship between an output voltage Vo and an output current Jo of the thermionic converter in the second case where the dopant concentration $n_C$ of the collector 2 is less than the dopant concentration $n_E$ of the emitter 1. In the graphs of FIGS. 6A, 6B, the horizontal axis represents the output voltage Vo of the thermionic converter, and the vertical axis represents the output current Jo of the thermionic converter.

In the second case, since the nitrogen (N) dopant concentration $n_C$ of the collector 2 is less than the phosphorus (P) dopant concentration $n_E$ of the emitter 1, the number of electrons present in the Fermi level of the collector 2 is less than the number of electrons present in the Fermi level of the emitter 1.

As can be seen by comparing FIG. 6A with FIG. 4A, the electron emission from the emitter 1 is the same between the first case and the second case. Regarding the electron emission from the collector 2, since the dopant concentration $n_C$ of the collector 2 is less than the dopant concentration $n_E$ of the emitter 1, the intercept ($=An_CT^2\exp(-(e\phi_C/kT))$) of the graph of the electron emission $J_C$ from the collector 2 is less than the intercept ($=An_ET^2\exp(-(e\phi_C/kT))$) of the graph of the electron emission Jo from the emitter 1 at the point where V=0.

That is, due to the fact that the dopant concentration $n_C$ of the collector 2 is less than the dopant concentration $n_E$ of the emitter 1, the maximum collector current $J_C$ at the point where V=0 in FIG. 4A is reduced to the maximum collector current $J_C$ at the point where V=0 in FIG. 6A. Therefore, a conversion region where the electron emission Jo from the emitter 1 is greater than the electron emission $J_C$ from the collector 2 is formed within a region where Vo>0.

Therefore, even when the electron emission from the collector 2 shown in FIG. 6A is cancelled from the electron emission from the emitter 1 shown in FIG. 6A, at least part of the electron emission from the emitter 1 can reach the collector 2 without being cancelled by the back emission from the collector 2. As a result, a graph representing conversion (i.e., power generation) becomes a curve that does not pass the point where Vo=0, and Jo=0, as shown in FIG. 6B. Thus, in the second case, the thermionic converter can achieve conversion even under the condition that the emitter 1 and the collector 2 have the same temperature. In this way, the output voltage Vo and the output current Jo, depending on the resistance of the load 3, are supplied to the load 3.

In view of the energy band diagram of FIG. 5, since the number of electrons present in the Fermi level of the emitter 1 is greater than the number of electrons present in the Fermi level of the collector 2, the number of thermionic electrons emitted from the emitter 1 to the collector 2 is greater than the number of thermionic electrons emitted from the collector 2 to the emitter 1 (i.e., back emission of thermionic electrons from the collector 2). Accordingly, all the thermionic electrons emitted from the emitter 1 are not canceled by the back emission of thermionic electrons from the collector 2. Thus, the thermionic electrons emitted from the emitter 1 to the collector 2 can contribute to the conversion. Therefore, when the dopant concentration $n_E$ of the emitter 1 is greater than the dopant concentration $n_C$ of the collector 2, the conversion can be achieved even under the condition that the emitter 1 and the collector 2 are heated to the same temperature.

As described above, "making the dopant concentration $n_E$ of the emitter 1 greater than the dopant concentration $n_C$ of the collector 2", in other words, "making the dopant concentration $n_C$ of the collector 2 less than the dopant concentration $n_E$ of the emitter 1" allows the thermionic converter to achieve the conversion under the condition that the emitter 1 and the collector 2 are heated to the same temperature.

In the first and second cases described above, the work function $\phi_E$ of the emitter 1 is less than the work function $\phi_C$ of the collector 2. As described below with reference to FIGS. 7-11, the conversion can be achieved even under the condition that the work function $\phi_E$ of the emitter 1 is greater than the work function $\phi_C$ of the collector 2.

Figure 7:
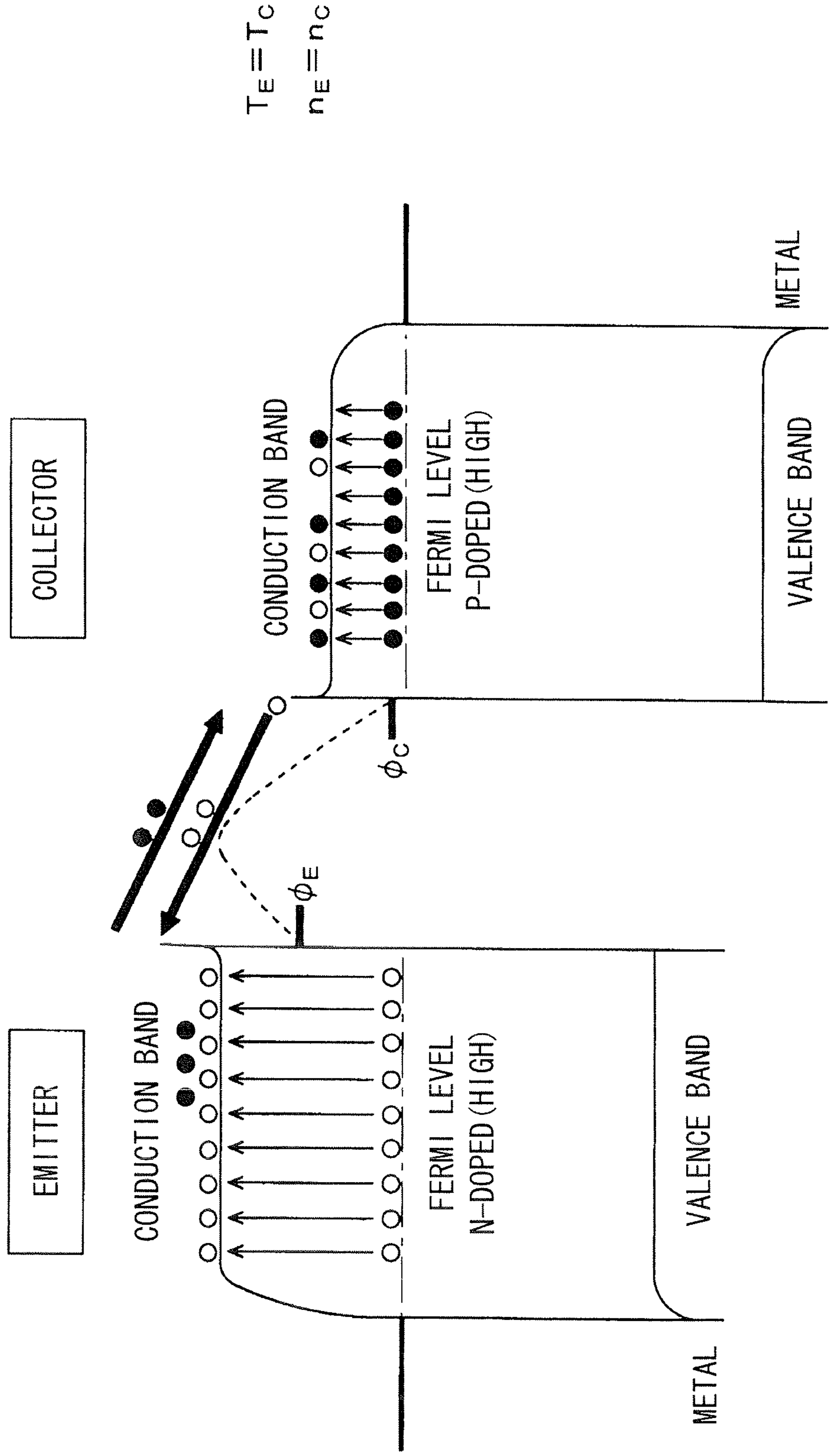
FIG. 7 is an energy band diagram under conditions that the emitter and the collector have the same dopant concentration and that the work function $\phi_E$ of the emitter is greater than the work function $\phi_C$ of the collector.
Figure 8B:
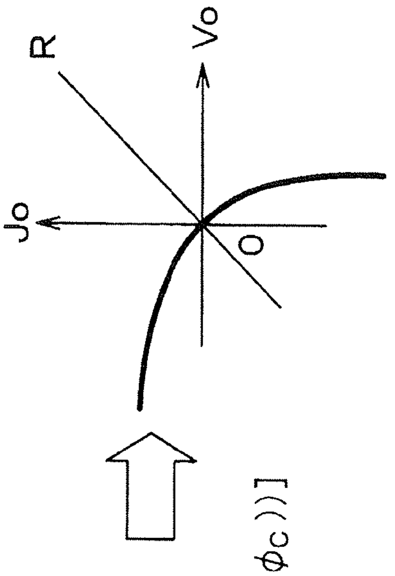
FIGS. 8A and 8B are diagrams illustrating the relationship between the output voltage and the output current of the thermionic converter under conditions that the emitter and the collector have the same dopant concentration and that the work function $\phi_E$ of the emitter is greater than the work function $\phi_C$ of the collector.
Figure 8A:
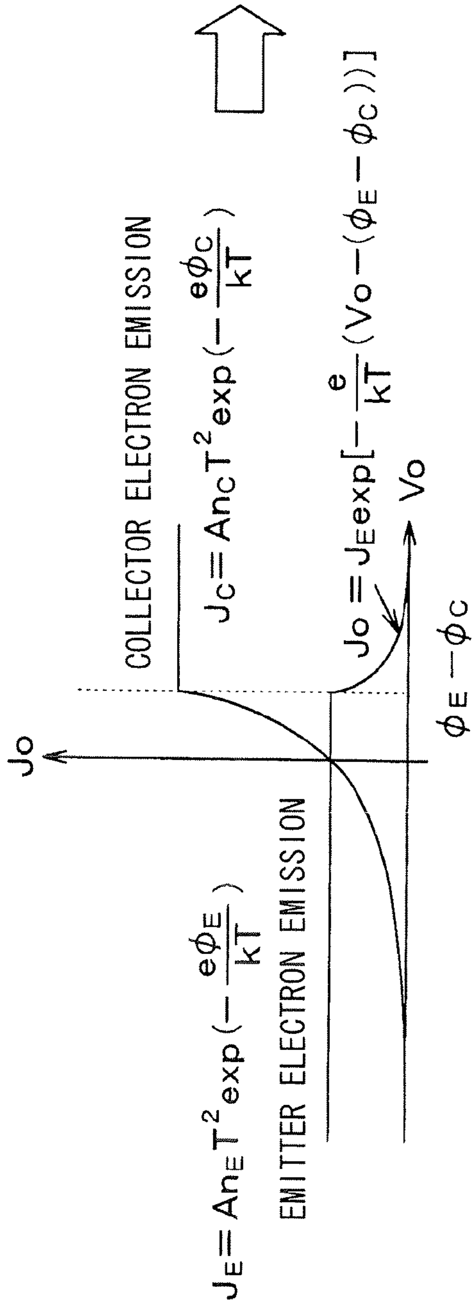

Firstly, a third case where the work function $\phi_E$ of the emitter 1 is greater than the work function $\phi_C$ of the collector 2, and the emitter 1 and the collector 2 have the same temperature (i.e., $T_E=T_C$) and have the same dopant concentration (i.e., $n_E=n_C$) is discussed below with reference to FIG. 7 and FIGS. 8A, 8B. FIG. 7 and FIGS. 8A, 8B correspond to FIG. 3 and FIGS. 4A, 4B, respectively. Like in the first case where $\phi_E<\phi_C$, in the third case where $\phi_E>\phi_C$, as shown in FIG. 8A, the intercept of the graph of the electron emission Jo from the emitter 1 is equal to the intercept of the graph of the electron emission $J_C$ from the collector 2 at the point where Vo=0.

Therefore, when the electron emission from the collector 2 is cancelled from the electron emission from the emitter 1, a graph representing conversion (i.e., power generation) becomes a curve passing the point where Vo=0, and Jo=0, as shown in FIG. 8B. This means that the conversion is not achieved. That is, as show in FIG. 7, the number of thermionic electrons emitted from the emitter 1 to the collector 2 (i.e., the number of thermionic electrons excited in the emitter 1) is equal to the number of thermionic electrons emitted from the collector 2 to the emitter 1 (i.e., the number of thermionic electrons excited in the collector 2). Thus, the output current Jo can be zero in total.

Figure 9:
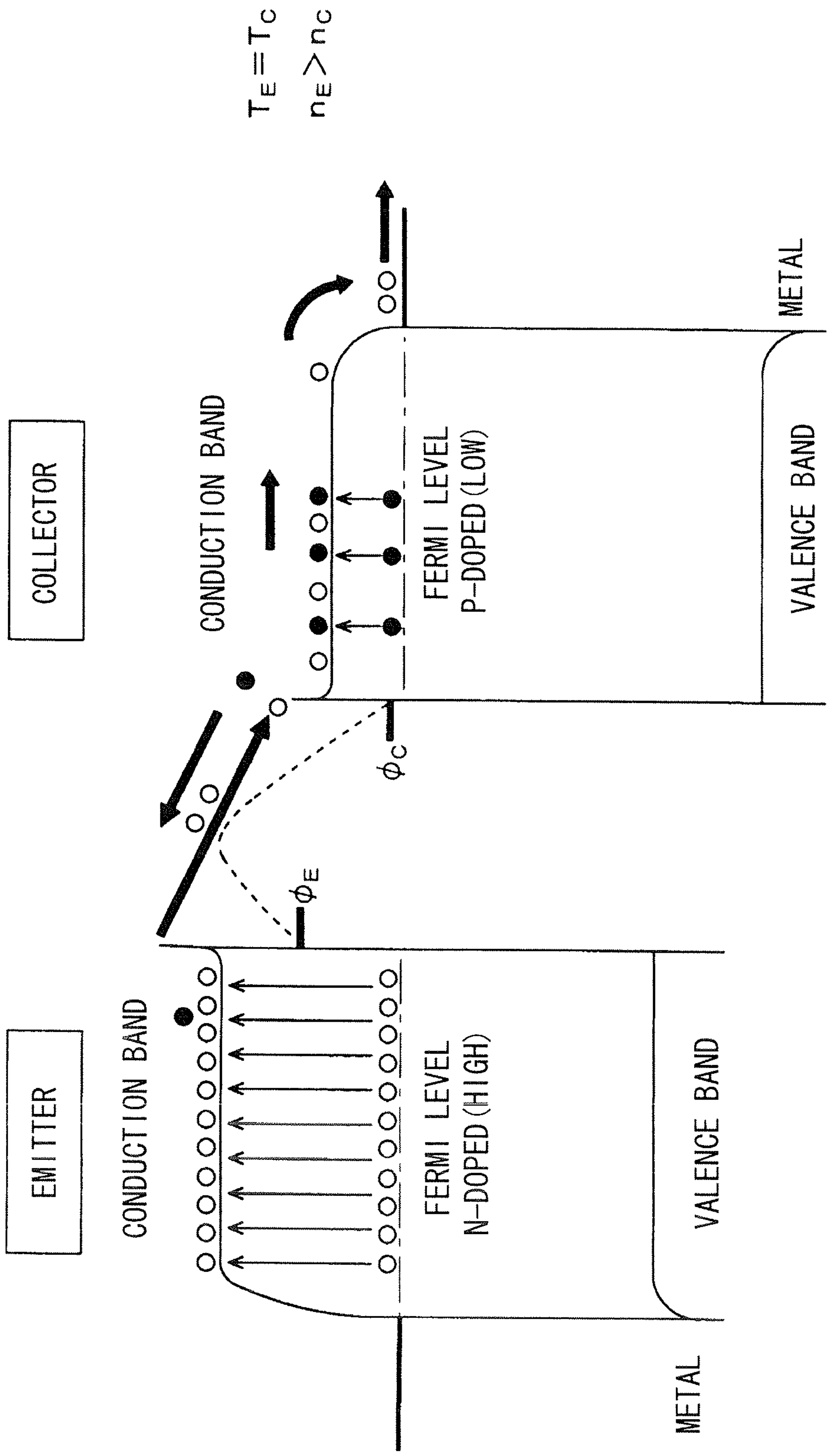
FIG. 9 is an energy band diagram under conditions that the dopant concentration of the emitter is greater than the dopant concentration of the collector and that the work function $\phi_E$ of the emitter is greater than the work function $\phi_C$ of the collector.
Figure 10A:
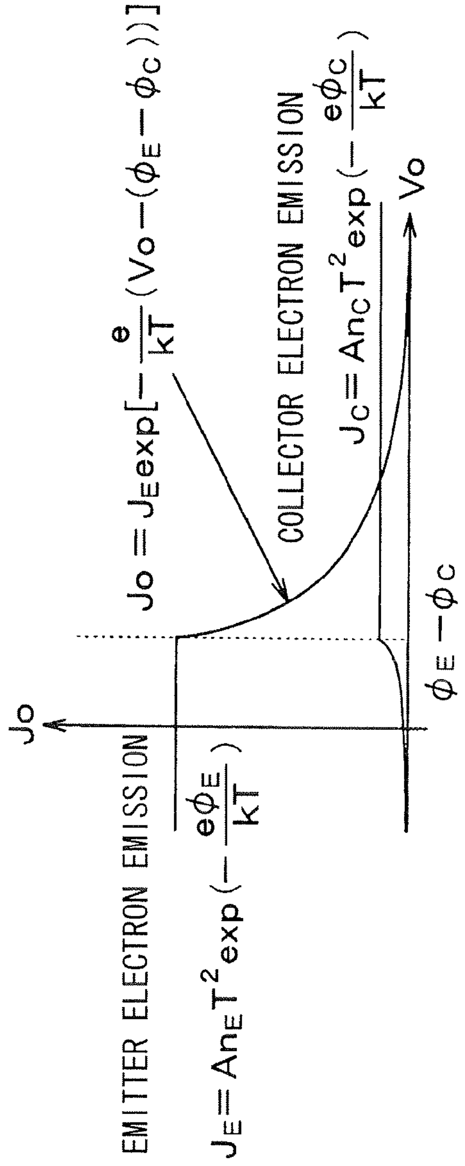
FIGS. 10A and 10B are diagrams illustrating the relationship between the output voltage and the output current of the thermionic converter under conditions that the dopant concentration of the emitter is greater than the dopant concentration of the collector and that the work function $\phi_E$ of the emitter is greater than the work function $\phi_C$ of the collector.
Figure 10B:
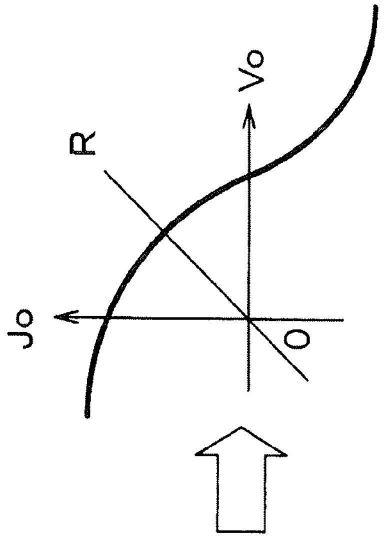

Next, a fourth case where the work function $\phi_E$ of the emitter 1 is greater than the work function $\phi_C$ of the collector 2, and the emitter 1 and the collector 2 have the same temperature (i.e., $T_E=T_C$) but have different dopant concentrations (i.e., $n_E>n_C$) is discussed below with reference to FIG. 9 and FIGS. 10A, 10B. FIG. 9 and FIGS. 10A, 10B correspond to FIG. 5 and FIGS. 6A, 6B, respectively. Like in the second case where $\phi_E<\phi_C$, in the fourth case where $\phi_E>\phi_C$, as shown in FIG. 10A, the intercept of the graph of the electron emission $J_C$ from the collector 2 is less than the intercept of the graph of the electron emission Jo from the emitter 1 at the point where Vo=0.

Therefore, when the electron emission from the collector 2 is cancelled from the electron emission from the emitter 1, at least part of the electron emission from the emitter 1 reaches the collector 2 without being cancelled by the back emission from the collector 2. As a result, a graph representing conversion (i.e., power generation) becomes a curve that does not pass the point where Vo=0, and Jo=0, as shown in FIG. 10B. Thus, when the dopant concentration $n_E$ of the emitter 1 is greater than the dopant concentration $n_C$ of the collector 2, the thermionic converter can achieve the conversion even under the conditions that the emitter 1 and the collector 2 have the same temperature and that the work function $\phi_E$ of the emitter 1 is greater than the work function $\phi_C$ of the collector 2.

That is, as shown in FIG. 9, the number of thermionic electrons emitted from the emitter 1 to the collector 2 is greater than the number of thermionic electrons emitted from the collector 2 to the emitter 1 (i.e., back emission of thermionic electrons from the collector 2). Accordingly, all the thermionic electrons emitted from the emitter 1 are not canceled by the back emission of thermionic electrons from the collector 2. Thus, the conversion occurs so that power can be generated.

Figure 11:
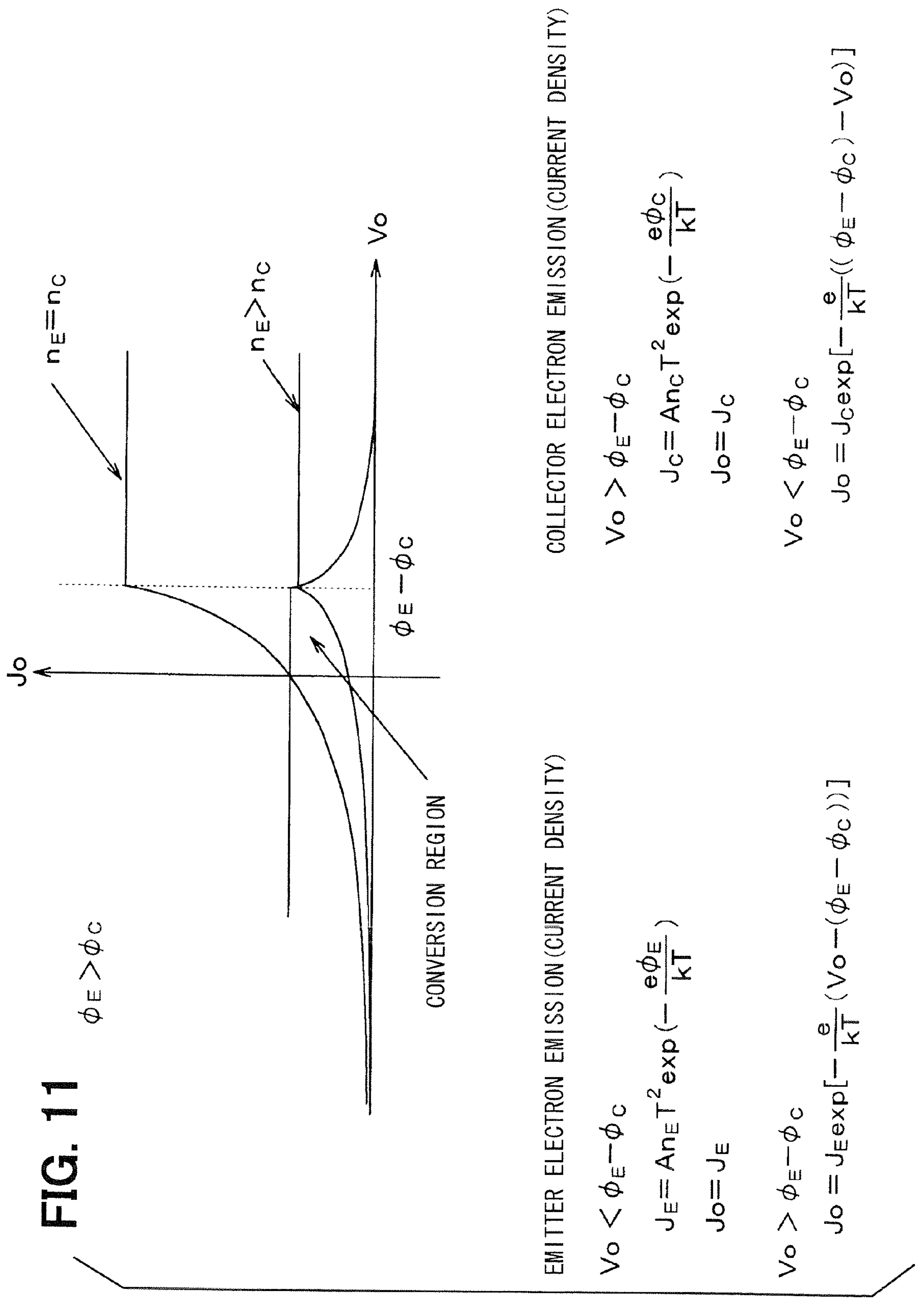
FIG. 11 is a diagram illustrating a conversion region under the condition that the work function $\phi_E$ of the emitter is greater than the work function $\phi_C$ of the collector.

FIG. 11 is a diagram illustrating a conversion region when the work function $\phi_E$ of the emitter 1 is greater than the work function $\phi_C$ of the collector 2. As shown in FIG. 11, when the output voltage Vo is less than "$\phi_E-\phi_C$", the electron emission from the emitter 1 has a constant value (i.e., $J_E=An_ET^2\exp(-e\phi_E/kT)$, $Jo=J_E$). In contrast, when the output voltage Vo is greater than "$\phi_E-\phi_C$", the electron emission from the emitter 1 decreases exponentially (i.e., $Jo=J_E\exp[-e(Vo-(\phi_E-\phi_C))/kT]$).

Likewise, as shown in FIG. 11, when the output voltage Vo is less than "$\phi_E-\phi_C$", the electron emission from the collector 2 has a constant value (i.e., $J_C=An_CT^2\exp(-e\phi_E/kT)$, $Jo=J_C$). In contrast, when the output voltage Vo is greater than "$\phi_E-\phi_C$", the electron emission from the collector 2 decreases exponentially (i.e., $Jo=J_C\exp[-e((\phi_E-\phi_C)-Vo)/kT]$). Thus, when the dopant concentration $n_E$ of the emitter 1 is greater than the dopant concentration $n_C$ of the collector 2, the conversion region where at least part of the electron emission from the emitter 1 reaches the collector 2 without being cancelled by the back emission from the collector 2 can be formed.

As described above, regardless of whether the work function $\phi_E$ of the emitter 1 is greater or less than the work function $\phi_C$ of the collector 2, the thermionic converter according to the first embodiment can achieve the conversion, i.e., power generation. In summary, when the concentration $n_E$ of the emitter 1 is equal to the concentration $n_C$ of the collector 2, it is difficult or impossible to achieve the conversion under the condition that the emitter 1 and the collector 2 have the same temperature. In contrast, when the concentration $n_E$ of the emitter 1 is greater than the concentration $n_C$ of the collector 2, it is possible to achieve the conversion even under the condition that the emitter 1 and the collector 2 have the same temperature.

The fact that the conversion can be achieved even under the condition that the emitter 1 and the collector 2 have the same temperature means that making the concentration $n_C$ of the collector 2 less than the concentration $n_E$ of the emitter 1 can have the equivalent effect of making the temperature of the collector 2 less than the temperature of the emitter 1. This is discussed in detail below with reference to FIGS. 12 and 13.

Figure 12:
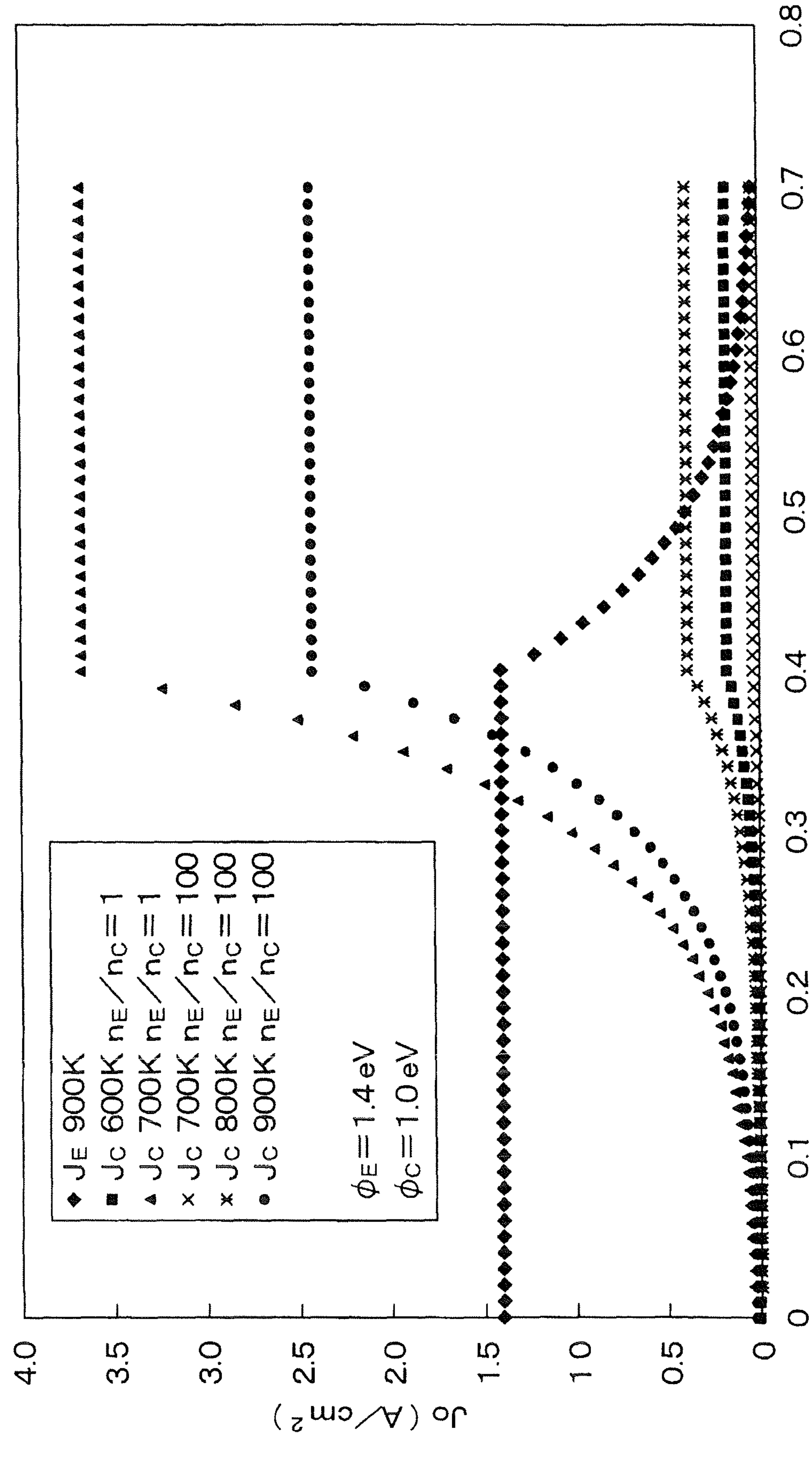
FIG. 12 is a diagram illustrating electron emission characteristics of the emitter and the collector.

FIG. 12 is a graph illustrating a result of a simulation experiment conducted by the present inventors to measure electron emission characteristics (ideal condition) of the emitter 1 and the collector 2 by changing a temperature ratio between the emitter 1 and the collector 2 and a dopant concentration ratio between the emitter 1 and the collector 2. FIG. 12 correspond to FIG. 4A and FIG. 6A. In the graph of FIG. 12, the horizontal axis represents the output voltage Vo of the thermionic converter, and the vertical axis represents the output current Jo of the thermionic converter.

In the simulation experiment, the work function $\phi_E$ of the emitter 1 is set to 1.4 eV, the work function $\phi_C$ of the collector 2 is set to 1.0 eV, and the temperature of the emitter 1 is set to 900K. The same holds for FIG. 13.

The followings can be seen from FIG. 12. When the emitter 1 and the collector 2 have the same dopant concentration (i.e., $n_E/n_C=1$), the maximum collector current $J_C$ is less when the collector 2 is heated to 600K (indicated by a solid rectangle) than when the collector 2 is heated to 700K (indicated by a solid triangle).

Further, when the dopant concentration $n_E$ of the emitter 1 is a hundred times greater than the dopant concentration $n_C$ of the collector 2 (i.e., $n_E/n_C=100$), the maximum collector current $J_C$ is less when the collector 2 is heated to 700K (indicated by a "x") than when the collector 2 is heated to 800K (indicated by an asterisk). When the dopant concentration $n_E$ of the emitter 1 is a hundred times greater than the dopant concentration $n_C$ of the collector 2 (i.e., $n_E/n_C=100$), the maximum collector current $J_C$ is less when the collector 2 is heated to 800K (indicated by the asterisk) than when the collector 2 is heated to 900K (indicated by a solid circle).

Furthermore, when the collector 2 is heated to 700K, the maximum collector current $J_C$ is less when the dopant concentration $n_E$ of the emitter 1 is a hundred times greater than the dopant concentration $n_C$ of the collector 2 (i.e., $n_E/n_C=100$) than when the emitter 1 and the collector 2 have the same dopant concentration (i.e., $n_E/n_C=1$). Therefore, the graph of FIG. 12 shows that making the concentration $n_C$ of the collector 2 less than the concentration $n_E$ of the emitter 1 can have the equivalent effect of making the temperature of the collector 2 less than the temperature of the emitter 1.

Figure 13:
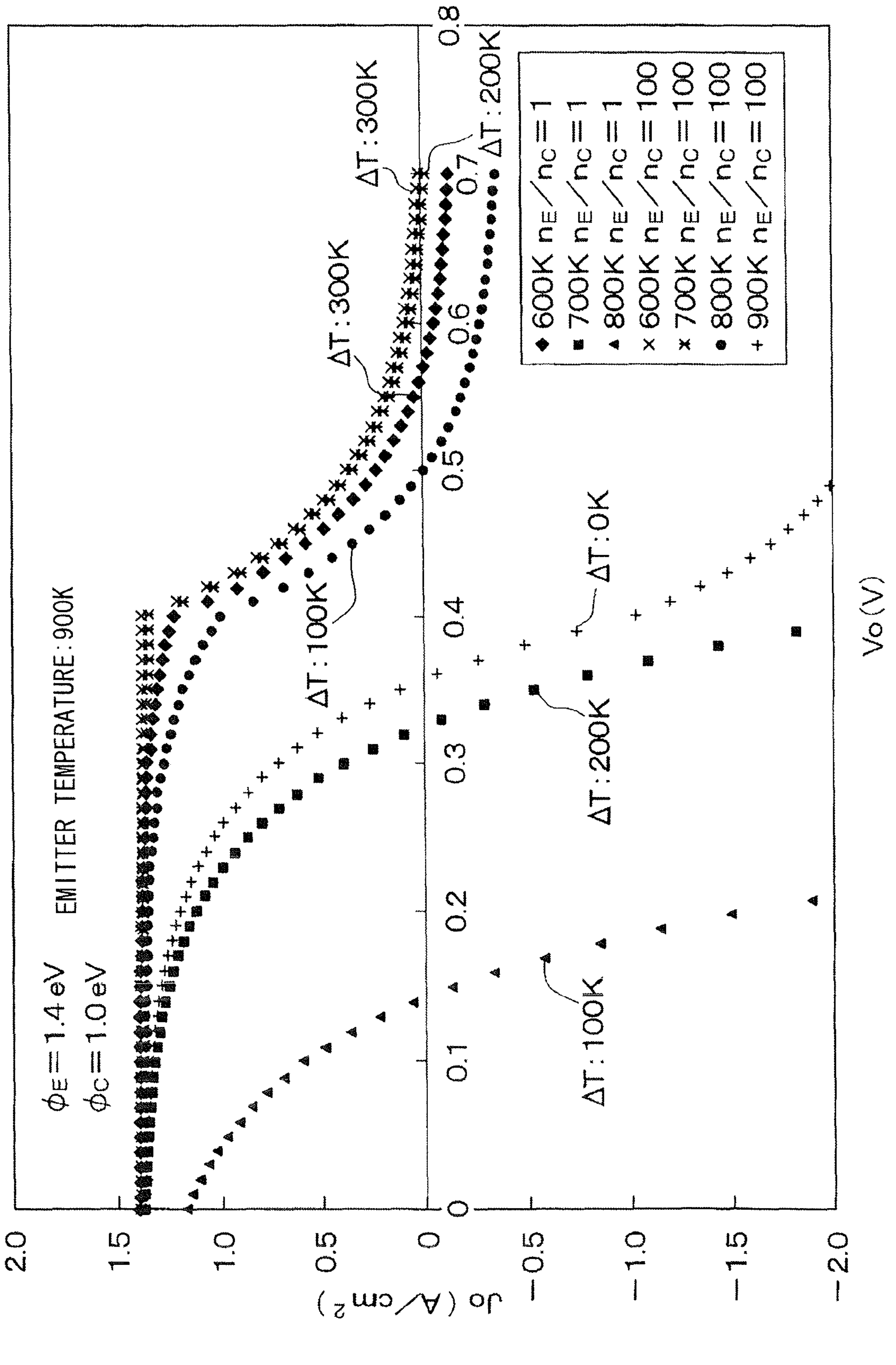
FIG. 13 is a diagram illustrating electron emission characteristics of the thermionic converter.

FIG. 13 is a graph illustrating a result of another simulation experiment conducted by the present inventors to measure electron emission characteristics (ideal condition) of the thermionic converter by changing the temperature of the collector 2 such that the temperature of the collector 2 is less than the temperature of the emitter 1 by a predetermined difference ΔT.

The followings can be seen from FIG. 13. When the emitter 1 and the collector 2 have the same dopant concentration (i.e., $n_E/n_C=1$), the output voltage Vo is less when the temperature difference ΔT is 100K (indicated by a solid triangle) than when the temperature difference ΔT is 200K (indicated by a solid rectangle). When the emitter 1 and the collector 2 have the same dopant concentration (i.e., $n_E/n_C=1$), the output voltage Vo is less when the temperature difference ΔT is 200K (indicated by the solid rectangle) than when the temperature difference ΔT is 300K (indicated by a solid rhombus).

Further, when the dopant concentration $n_E$ of the emitter 1 is a hundred times greater than the dopant concentration $n_C$ of the collector 2 (i.e., $n_E/n_C=100$), the output voltage Vo is less when the temperature difference ΔT is 0K (indicated by a plus) than when the temperature difference ΔT is 100K (indicated by a solid circle). When the dopant concentration $n_E$ of the emitter 1 is a hundred times greater than the dopant concentration $n_C$ of the collector 2 (i.e., $n_E/n_C=100$), the output voltage Vo is less when the temperature difference ΔT is 100K (indicated by the solid circle) than when the temperature difference ΔT is 200K (indicated by an asterisk). When the dopant concentration $n_E$ of the emitter 1 is a hundred times greater than the dopant concentration $n_C$ of the collector 2 (i.e., $n_E/n_C=100$), the output voltage Vo is less when the temperature difference ΔT is 200K (indicated by the asterisk) than when the temperature difference ΔT is 300K (indicated by a "x").

Furthermore, when the collector 2 is heated to 700K, i.e., when the temperature difference ΔT is 200K, the output voltage Vo is greater when (indicated by the asterisk) the dopant concentration $n_E$ of the emitter 1 is a hundred times greater than the dopant concentration $n_C$ of the collector 2 (i.e., $n_E/n_C=100$) than when (indicated by the solid rectangular) the emitter 1 and the collector 2 have the same dopant concentration (i.e., $n_E/n_C=1$).

That is, the curve indicated by the solid rectangle and representing the output voltage Vo under the conditions that the emitter 1 and the collector 2 have the same dopant concentration (i.e., $n_E/n_C=1$) and that the temperature difference ΔT is 200K is almost the same as the curve indicated by the plus and representing the output voltage Vo under the conditions that the dopant concentration $n_E$ of the emitter 1 is a hundred times greater than the dopant concentration $n_C$ of the collector 2 (i.e., $n_E/n_C=100$) and that the temperature difference ΔT is 0K. This means that reducing the concentration $n_C$ of the collector 2 to a hundredth of the concentration $n_E$ of the emitter 1 can have the equivalent effect of making the temperature of the collector 2 less than the temperature of the emitter 1 by 200° C.

In other words, reducing the concentration $n_C$ of the collector 2 to one-tenth of the concentration $n_E$ of the emitter 1 can have the equivalent effect of making the temperature of the collector 2 less than the temperature of the emitter 1 by 100° C. The thermionic converter can achieve the conversion, when the temperature difference ΔT between the emitter 1 and the collector 2 is 100° C. or more. Therefore, it is preferable that the concentration $n_C$ of the collector 2 be equal to or less than one-tenth of the concentration $n_E$ of the emitter 1.

As described above according to the first embodiment, phosphorus (P) is added as a dopant to the diamond semiconductor thin film 1*b* of the emitter 1, and nitrogen (N) is added as a dopant to the diamond semiconductor thin film 2*b* of the collector 2. That is, each of the diamond semiconductor thin films 1*b*, 2*b* is of N-type. In the case of phosphorus-doped diamond, the donor level is located 0.6 eV below the conduction band. For example, the emitter 1 can have the phosphorus concentration of $2\times10^{2o}$ (atoms/cm$^3$), and the collector 2 have the nitrogen concentration of $1\times10^{19}$ (atoms/cm$^3$), so that the dopant concentration $n_C$ of the collector 2 can be one-twentieth of the dopant concentration $n_E$ of the emitter 1. The present inventors have confirmed that when the emitter 1 and the collector 2 have such dopant concentrations, the conversion can be achieved by heating the emitter 1 to 650° C. while naturally cooling the collector 2 without forced cooling.

Thus, when the dopant concentration $n_C$ of the collector 2 is less than the dopant concentration $n_E$ of the emitter 1, the number of electrons that are emitted from the collector 2 and reach the emitter 1 is reduced so that the conversion efficiency of the thermionic converter can be improved.

Alternatively, nitrogen (N) can be added as a dopant to each of the diamond semiconductor thin film 1*b* of the emitter 1 and the diamond semiconductor thin film 2*b* of the collector 2. In the case of nitrogen-doped diamond, the donor level is located 0.7 eV below the conduction band. Due to the fact that the emitter 1 and the collector 2 have the same dopant (i.e., nitrogen), the emitter 1 and the collector 2 have the same donar level. However, when the nitrogen concentration $n_C$ of the collector 2 is less than the nitrogen concentration $n_E$ of the emitter 1, the probability of thermionic electron emission from the collector 2 is less than the probability of thermionic electron emission from the emitter 1.

In such a case, although the emitter 1 and the collector 2 have the same donar level, the effective Felmi level of the collector 2 is deeper than that of the emitter 1 due to the fact that the concentration $n_C$ of the collector 2 is less than the concentration $n_E$ of the emitter 1. Therefore, the probability of thermal excitation in the collector 2 is reduced.

For example, the emitter 1 can have the nitrogen concentration of $1\times10^{2\circ}$ (atoms/$cm^3$), and the collector 2 can have the nitrogen concentration of $1\times10^{19}$ (atoms/$cm^3$), so that the dopant concentration $n_C$ of the collector 2 can be one-tenth of the dopant concentration $n_E$ of the emitter 1. The present inventors have confirmed that when the emitter 1 and the collector 2 have such dopant concentrations, the conversion can be achieved even under the condition that the emitter 1 and the collector 2 have the same temperature of 600° C.

Alternatively, antimony (Sb) can be added as a dopant to the diamond semiconductor thin film 1*b* of the emitter 1, and sulfur (S) is added as a dopant to the diamond semiconductor thin film 2*b* of the collector 2. In the case of antimony-doped diamond, the donor level is located 0.2 eV below the conduction band. In the case of sulfur-doped diamond, the donor level is located 0.4 eV below the conduction band.

The present inventors have confirmed that when the emitter 1 and the collector 2 have such dopant concentrations, the conversion can be achieved under the condition that the emitter 1 and the collector 2 are heated to the same temperature of 400° C. The temperature of 400° C. is very low compared to a temperature (about 1500° C.) to which the emitter 1 and the collector 2 that are made of metal need to be heated to achieve the conversion.

As described above, according to the first embodiment, the dopant concentration $n_C$ of the collector 2 is less than the dopant concentration $n_E$ of the emitter 1. In such an approach, the number of electrons that are emitted from the collector 2 and reach the emitter 1 is reduced so that the conversion efficiency of the thermionic converter can be improved. That is, since the thermionic electron emission from the collector 2 to the emitter 1 is reduced, the conversion efficiency of the thermionic converter is improved.

As mentioned previously, the conventional thermionic converter has the disadvantages that the conversion does not occur unless the temperature of the collector 2 is less than the temperature of the emitter 1 and that the conversion efficiency is reduced when the difference in temperature between the emitter 1 and the collector 2 becomes small. In contrast, according to the first embodiment, the thermionic converter can achieve the conversion even when the emitter 1 and the collector 2 have the same temperature, because the emitter 1 has the high-doped diamond semiconductor thin film 1*b*, and the collector 2 has the low-doped diamond semiconductor thin film 2*b*. Therefore, there is no need to cool the collector 2.

In summary, when the emitter 1 and the collector 2 are made of a semiconductor material (e.g., diamond semiconductor) having a negative electron affinity (NEA), the following advantages can be obtained by making the dopant concentration $n_E$ of the emitter 1 greater than the dopant concentration $n_C$ of the collector 2.

Firstly, the work function $\phi_E$ of the emitter 1 becomes equal to or less than the work function $\phi_C$ of the collector 2. That is, when the emitter 1 and the collector 2 have the same temperature, the number of thermionic electrons excited in the emitter 1 having the smaller work function $\phi_E$ is greater than the number of thermionic electrons excited in the collector 2 having the larger work function $\phi_C$.

Secondly, the doping depth of the dopant in the emitter 1 becomes equal to or less than the doping depth of the dopant in the collector 2. The "doping depth" is an energy depth from the bottom of the conduction band to the Felmi level.

Thirdly, the temperature of the collector 2 to which heat is applied from a heat source becomes less than the temperature of the emitter 1 to which heat is applied from the heat source. That is, a reduction in the dopant concentration results in a reduction in the temperature.

Thus, the back emission of thermionic electrons from the collector 2 is reduced without reducing the temperature of the collector 2 so that the conversion efficiency of the thermionic converter can be improved.

Second Embodiment

A thermionic converter according to a second embodiment of the present invention is described below with reference to FIG. 14. The thermionic converter includes multiple thermionic converting devices 5.

Each thermionic converting device 5 corresponds to the thermionic converter show in FIG. 1. Specifically, each thermionic converting device 5 includes the emitter 1 and the collector 2 that is spaced and opposite to the emitter 1. The thermionic converting devices 5 are connected in series to construct a single thermionic converter.

According to the second embodiment, the substrate 2*a* of the collector 2 of one thermionic converting device 5 is connected through a wire 6 to the substrate is of the emitter 1 of another thermionic converting device 5. In this way, three thermionic converting devices 5 are connected in series through the wire 6 to construct a single thermionic converter. It is noted that all the three thermionic converting devices 5 connected in series are placed in the vacuum chamber 4.

As described above, according to the second embodiment, the thermionic converter includes multiple thermionic converting devices 5, each of which corresponds to the thermionic converter show in FIG. 1. The thermionic converting devices 5 are connected in series so that the thermionic converter of the second embodiment can have high electromotive force compared to the thermionic converter of the first embodiment.

Since each thermionic converting device 5 corresponds to the thermionic converter shown in FIG. 1, there is no need for a reduction in the temperature of the collector 2 of each thermionic converting device 5. Further, there is no need for protection against heat transmission from the emitter 1 to the collector 2. That is, since the conversion is achieved even under the condition that the emitter 1 and the collector 2 have the same temperature, there is no need to take into consideration the effect of heat transmission from the emitter 1 to the collector 2 through the wire 6. Accordingly, a cooling device for cooling the collector 2 is not required. Thus, the thermionic converting devices 5 can be connected in series in a simple manner so that the thermionic converter can output high voltage.

Modifications

The embodiment described above can be modified in various ways, for example, as follows.

In the embodiments, the emitter 1 and the collector 2 have the substrates 1*a*, 2*a* and the diamond semiconductor thin films 1*b*, 2*b* formed on the substrates 1*a*, 2*a*, respectively. Alternatively, the diamond semiconductor thin films 1*b*, 2*b* themselves can be the emitter 1 and the collector 2 without the substrates 1*a*, 2*a*, respectively. That is, each of the emitter 1 and the collector 2 can be made of a semiconductor material to which a semiconductor impurity is doped.

In the embodiments, diamond is used as a semiconductor material for the emitter 1 and the collector 2. Alternatively, the emitter 1 and the collector 2 can be made of a semiconductor material other than diamond. For example, boron nitride (BN) can be used as a semiconductor material for the emitter 1 and the collector 2. Alternatively, a carbon film with an amorphous structure mainly having carbon atoms can be used as a semiconductor material for the emitter 1 and the collector 2. Like diamond, since boron nitride and a carbon film have a negative electron affinity, boron nitride and a carbon film can be used for the thermionic converter.

In the second embodiment, the thermionic converting devices 5 are connected in series by using the wire 6. Alternatively, the thermionic converting devices 5 can be directly connected in series without using the wire 6. For example, as shown in FIG. 15A, in a case where the collector 2 of one thermionic converting device 5 is connected to the emitter 1 of another thermionic converting device 5, a back surface of the substrate 2*a* of the collector 2 is bonded or joined to a back surface of the substrate is of the emitter 1. In such an approach, one thermionic converting device 5 is directly connected in series with the other thermionic converting device 5 without using the wire 6. It is noted that the diamond semiconductor thin film 1*b*, 2*b* are formed on front surfaces, opposite to the back surfaces, of the substrate 1*a*, 2*a* of the emitter 1 and the collector 2, respectively.

Figure 15B:
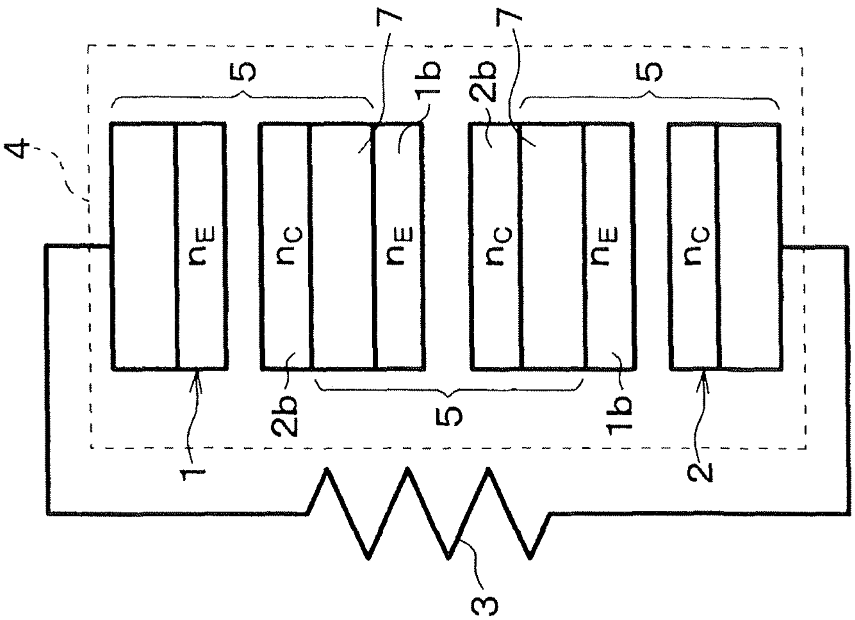
FIG. 15B is a diagram illustrating a thermionic converter according to another modification of the second embodiment.
Figure 15A:
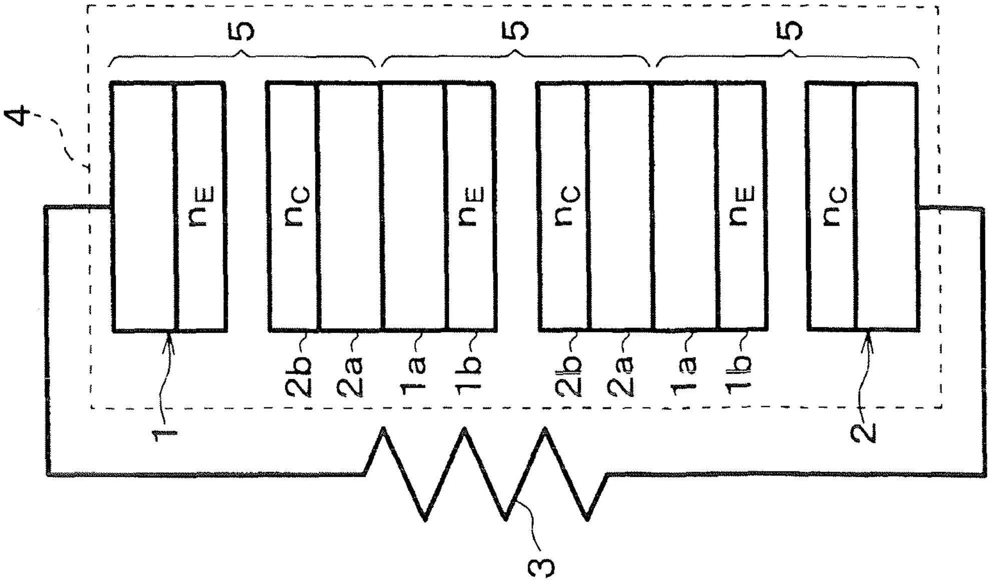
FIG. 15A is a diagram illustrating a thermionic converter according to a modification of the second embodiment.

Alternatively, as shown in FIG. 15B, one emitter 1 and one collector 2 that are located between another emitter 1 connected to the load 3 and another collector 2 connected to the load 3 can share a common substrate 7. In this case, the diamond semiconductor thin film 1*b*, 2*b* are formed on a front surface and a back surface of the common substrate 7, respectively. In such an approach, both the emitter 1 and the collector 2 can be formed on the common substrate 7. The diamond semiconductor thin film 1*b* on the front surface of the common substrate 7 forms one thermionic converting device 5, and the diamond semiconductor thin film 2*b* on the back surface of the common substrate 7 forms the other thermionic converting device 5.

Figure 14:
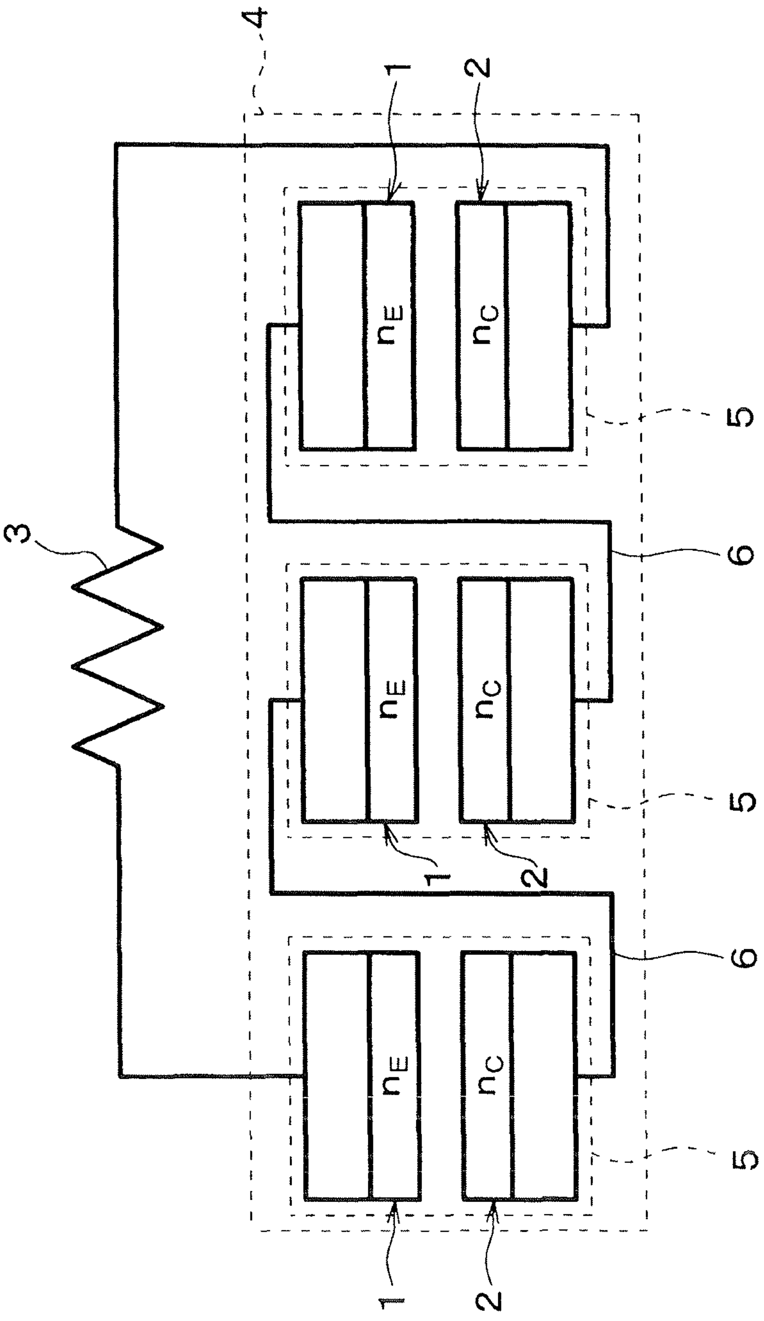
FIG. 14 is a diagram illustrating a thermionic converter according to a second embodiment of the present invention.

In summary, since the conversion can be achieved even under the condition that the emitter 1 and the collector 2 are heated to the same temperature, multiple emitters 1 and multiple collectors 2 can be arranged in various manners, for example, as shown in FIG. 14 and FIGS. 15A and 15B. That is, a special device, method, and arrangement for cooling the collector 2 are not required. Therefore, the flexibility of connecting multiple thermionic converting devices 5 in series can be improved.

Such changes and modifications are to be understood as being within the scope of the present invention as defined by the appended claims.

What is claimed is:

1. A thermionic converter for converting thermal energy into electrical energy, the thermionic converter comprising:

an emitter configured to emit thermionic electrons upon receipt of thermal energy from a heat source, the emitter made of a first semiconductor material to which a first semiconductor impurity is doped with a first concentration;

a collector spaced from and arranged opposite to the emitter, the collector configured to receive the emitted thermionic electrons and convert the thermal energy into electrical energy, the collector made of a second semiconductor material to which a second semiconductor impurity is doped with a second concentration less than the first concentration; and a vacuum chamber that accommodates the emitter and the collector and maintains a separation distance between the collector and the emitter under vacuum, wherein the emitter includes a first substrate and a first semiconductor film on the first substrate, the first semiconductor film having a single-layer structure and being made of the first semiconductor material to which the first semiconductor impurity is doped with the first concentration, and the collector includes a second substrate and a second semiconductor film on the second substrate, the second semiconductor film having a single-layer structure and being made of the second semiconductor material to which the second semiconductor impurity is doped with the second concentration.

2. The thermionic converter according to claim 1, wherein each of the first semiconductor material and the second semiconductor material is diamond.

3. The thermionic converter according to claim 2, wherein the emitter has a first hydrogen-terminated surface, the collector has a second hydrogen-terminated surface that is spaced and opposite to the first hydrogen-terminated surface of the emitter.

4. The thermionic converter according to claim 1, wherein each of the first semiconductor material and the second semiconductor material is boron nitride.

5. The thermionic converter according to claim 1, wherein each of the first semiconductor material and the second semiconductor material is a carbon film with an amorphous structure mainly having carbon atoms.

6. The thermionic converter according to claim 1, wherein the emitter comprises a plurality of emitters, the collector comprises a plurality of collectors, the plurality of emitters and the plurality of collectors provide a plurality of thermionic converting devices, and the plurality of thermionic converting devices are connected in series.

7. A thermionic converter for converting thermal energy into electrical energy, the thermionic converter comprising:

an emitter configured to emit thermionic electrons in response to heat from a heat source, the emitter being a first semiconductor material to which a first semiconductor impurity is doped with a first concentration; and a collector arranged to face the emitter across a separation distance between the collector and the emitter, the collector configured to receive the thermionic electrons emitted by the emitter, and the collector being a second semiconductor material to which a second semiconductor impurity is doped with a second concentration less than the first concentration; and a vacuum chamber surrounding the separation distance, and while the emitter is heated by the heat source, the thermionic electrons move across the separation distance within the vacuum chamber from a surface of the emitter to a surface of the collector, thereby creating electrical energy from thermal energy, wherein the emitter includes a first substrate and a first semiconductor film on the first substrate, the first semiconductor film having a single-layer structure and being made of the first semiconductor material to which the first semiconductor impurity is doped with the first concentration, and the collector includes a second substrate and a second semiconductor film on the second substrate, the second semiconductor film having a single-layer structure and being made of the second semiconductor material to which the second semiconductor impurity is doped with the second concentration.

8. The thermionic converter according to claim 7, wherein each of the first semiconductor material and the second semiconductor material is diamond.

9. The thermionic converter according to claim 8, wherein the emitter has a first hydrogen-terminated surface, and the collector has a second hydrogen-terminated surface that is spaced and opposite to the first hydrogen-terminated surface of the emitter.

10. The thermionic converter according to claim 8, wherein the emitter comprises a plurality of emitters, the collector comprises a plurality of collectors, the plurality of emitters and the plurality of collectors provide a plurality of thermionic converting devices, and the plurality of thermionic converting devices is connected in series.

11. The thermionic converter according to claim 7, wherein each of the first semiconductor material and the second semiconductor material is boron nitride.

12. The thermionic converter according to claim 7, wherein each of the first semiconductor material and the second semiconductor material is a carbon film with an amorphous structure mainly having carbon atoms.

13. A thermionic converter for converting thermal energy into electrical energy, the thermionic converter comprising:

an emitter configured to emit thermionic electrons upon receipt of thermal energy from a heat source;

a collector spaced from and arranged opposite to the emitter and configured to receive the thermionic electrons emitted from the emitter and convert the thermal energy into electrical energy, and a vacuum chamber that accommodates the emitter and the collector to maintain a separation distance between the collector and the emitter under vacuum, wherein the emitter and the collector are configured to emit thermionic electrons at a same temperature, the emitter emitting thermionic electrons to the collector, the collector emitting thermionic electrons to the emitter, and the emitter emits a larger number of thermionic electrons than the collector at the same temperature, the emitter is made of a first semiconductor material to which a first semiconductor impurity is doped with a first concentration, the emitter includes a first substrate and a first semiconductor film on the first substrate, and the first semiconductor film has a single-layer structure and is made of the first semiconductor material to which the first semiconductor impurity is doped with the first concentration, and the collector is made of a second semiconductor material to which a second semiconductor impurity is doped with a second concentration less than the first concentration, the collector includes a second substrate and a second semiconductor film on a second substrate, and the second semiconductor film has a single-layer structure and is made of the second semiconductor material to which the second semiconductor impurity is doped with the second concentration.

14. The thermionic converter according to claim 13, wherein the emitter comprises a plurality of emitters, the collector comprises a plurality of collectors, the plurality of emitters and the plurality of collectors provide a plurality of thermionic converting devices, and the plurality of thermionic converting devices is connected in series.

15. A thermionic converter for converting thermal energy into electrical energy, the thermionic converter comprising:

an emitter configured to emit thermionic electrons upon receipt of thermal energy from a heat source, the emitter made of a first semiconductor material to which a first semiconductor impurity is doped with a first concentration;

a collector spaced from and arranged opposite to the emitter, the collector configured to receive the emitted thermionic electrons and convert the thermal energy into electrical energy, the collector made of a second semiconductor material to which a second semiconductor impurity is doped with a second concentration less than the first concentration; and a vacuum chamber that accommodates the emitter and the collector and maintains a separation distance between the collector and the emitter under vacuum, wherein the first semiconductor material and the second semiconductor material have surfaces that face each other across the separation distance, the surface of the first semiconductor material including the first semiconductor impurity doped to the first concentration, the surface of the second semiconductor material including the second semiconductor impurity doped to the second concentration that is less than the first concentration.

16. A thermionic converter for converting thermal energy into electrical energy, the thermionic converter comprising:

an emitter configured to emit thermionic electrons in response to heat from a heat source, the emitter being a first semiconductor material to which a first semiconductor impurity is doped with a first concentration;

a collector arranged to face the emitter across a separation distance between the collector and the emitter, the collector configured to receive the thermionic electrons emitted by the emitter, and the collector being a second semiconductor material to which a second semiconductor impurity is doped with a second concentration less than the first concentration; and a vacuum chamber surrounding the separation distance, and while the emitter is heated by the heat source, the thermionic electrons move across the separation distance within the vacuum chamber from a surface of the emitter to a surface of the collector, thereby creating electrical energy from thermal energy, wherein the first semiconductor material and the second semiconductor material have surfaces that face each other across the separation distance, the surface of the first semiconductor material including the first semiconductor impurity doped to the first concentration, the surface of the second semiconductor material including the second semiconductor impurity doped to the second concentration that is less than the first concentration.

* * * * *